(12) United States Patent
Kobayashi et al.

(10) Patent No.: US 6,515,436 B2
(45) Date of Patent: Feb. 4, 2003

(54) DISCHARGE LAMP LIGHTING APPARATUS AND LIGHTING APPLIANCE EMPLOYING SAME

(75) Inventors: Masami Kobayashi, Kanagawa-ken (JP); Yoshiaki Hara, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 09/820,913

(22) Filed: Mar. 30, 2001

(65) Prior Publication Data

US 2002/0011807 A1 Jan. 31, 2002

(30) Foreign Application Priority Data

Mar. 31, 2000 (JP) .................................. 2000-099954
May 16, 2000 (JP) .................................. 2000-143996
Nov. 29, 2000 (JP) .................................. 2000-362207
Feb. 22, 2001 (JP) .................................. 2001-046321

(51) Int. Cl.[7] ............................................. H05B 37/02
(52) U.S. Cl. ...................... 315/307; 315/219; 315/224
(58) Field of Search ................................ 315/224, 225, 315/307, 219

(56) References Cited

U.S. PATENT DOCUMENTS 5,969,483 A * 10/1999 Li et al. ..................... 315/225

FOREIGN PATENT DOCUMENTS

JP 2001-15287 1/2001

* cited by examiner

Primary Examiner—David Vu
(74) Attorney, Agent, or Firm—Pillsbury Winthrop LLP

(57) ABSTRACT

A discharge lamp lighting apparatus includes a discharge lamp having a pair of electrodes, at least one electrode being placed on an outer surface of a discharge vessel containing an inert gas-dominated discharge agent, a high frequency generator having an output transformer and a switching apparatus, a high frequency operation detector for detecting a high frequency and outputting a high frequency operation detection signal, a controlling responsive to the high frequency operation detection signal for performing a feedback control to the switching apparatus to make the high frequency operation detection signal a first level and protecting the apparatus when the high frequency operation detection signal is changed to a second level, and a no-load detector for forcefully changing the high frequency operation detection signal supplied to the controller to the second level when detected the nonleaded state.

8 Claims, 17 Drawing Sheets

DISCHARGE LAMP LIGHTING APPARATUS AND LIGHTING APPLIANCE EMPLOYING SAME

FIELD OF THE INVENTION

The present invention relates to a discharge lamp lighting apparatus and a lighting appliance employing the same for lighting the discharge lamp in which an inert gas-dominated discharge agent is filled.

BACKGROUND OF THE INVENTION

The inert gas discharge lamp has an advantage of a luminous flux start-up property at a low temperature since in the inert gas discharge lamp the phosphor is emitted by an ultraviolet radiation which is generated by the inert gas discharge and the luminous energy does not depend on the temperature. However, it also has a drawback that the luminous efficiency is lower than that of a mercury-vapor discharge lamp.

On the other hand, the discharge lamp which radiates a visible light by the fluorescent substance layer excited by the ultraviolet radiation generated by the inert gas discharge is improved the luminous efficiency by pulsive-lighting is described in the Japanese Patents, Tokkai-sho 58-135564, Tokkai-Hei 2-174097, Tokko-Hei 8-12794, and Tokkai-Hei 9-199285.

Further, a discharge lamp lighting apparatus having such effects those of the prior arts by applying a high frequency AC voltage whose waveform is adjusted by superposing DC voltages so that a lamp current having a pause period flows across a pair of the electrodes of the discharge lamp, at least one of which is placed on the outer surface of the discharge vessel, is also proposed.

By the way, since a discharge lamp having a pair of the electrodes, in which at least one of the electrodes is placed on the outer surface of the discharge vessel, uses a dielectric barrier discharge, there is a tendency of that generally a starting voltage and a lamp voltage become very high.

Accordingly there is a problem that a high frequency generator breaks down due to the high voltage generated by the high frequency generator itself, if the high frequency generator keeps on operating at a no-loaded state. Further, the insulation of the discharge lamp, a harness wire for feeding power, or a high voltage part of the high frequency generator are easy to be breakdown since the above-described high voltage is applied. When the insulation has been breakdown, it progresses to a serious problem of causing an abnormal discharge.

On the other hand, in the dielectric barrier discharge lamp, it is supplied with a power of a high voltage and a high frequency. Therefore, an abnormal discharge at a high voltage and a high-frequency in different from those of normal discharge occurring between a pair of electrodes in a discharge vessel is relatively easy to occur, even when it is not in a no-load state. Such an abnormal discharge may occur in any of an electrode, a high frequency generator, and a harness connecting the electrode and the high frequency generator with each other. Abnormal discharge at an electrode may also occur in any of between different polarity points and between same polarity points. Abnormal discharge between different polarity points occurs, for example, along the external surface of a discharge vessel. The abnormal discharge between same polarity points occurs in such a case that there is a crack on one electrode. Abnormal discharge at the harness occurs in such as a case when the insulation of the harness is damaged. Abnormal discharge in a high frequency generator occurs in such cases that there are an insulation degradation of an output transformer, an insulation degradation of a high voltage pattern on a printed-wiring board, and a crack or a poor contact at a soldering of a high voltage pin of an output connector.

Once such an abnormal discharge has been occurred, an abnormal discharge occurring region will evolve heat. As a result, there is a danger of that a smoking or a firing may occur at the discharge lamp, the harness, or the high frequency power supply. Furthermore, by such abnormal discharges the near-by materials of abnormal discharge occurring region is degraded, or potentially causes a smoking or firing. Such a smoking or firing must be prevented before it happens.

On the other hand, the Japanese Patent Application Tokkai 2001-15827 which was filed before the present application, but published after the publication of the original application of the present application discloses a technology in that an abnormal discharge detection circuit is provided in a dielectric barrier discharge lamp device for detecting the abnormal discharge based on an electrical behavior of a power supply so as to suspend feeding of a high voltage AC current from the power supply to the dielectric barrier discharge lamp device. However, it is not a particular technology to detect an abnormal discharge of a discharge lamp based on such an electrical behavior of the power supply. By the way, if taking note on FIG. 7 and its associated description in the Tokkai 2001-15827, there is disclosed a circuitry for exclusively extracting the high frequency components 31 in the output amount detection signal detected upon an abnormal discharge so as to suspend the power supply.

That is, the circuitry of the Tokkai 2001-15827 has a resistor 120 for detecting a discharge current connected in series a dielectric barrier discharge lamp and a high pass filter 29 for exclusively extracting the high frequency components 31 in the output amount detection signal detected upon an abnormal discharge from a voltage drop across the resistor 120. The circuitry has a diode 124 for rectifying the high frequency components 31 outputted from the high pass filter 29, and an integrator comprised of a capacitor 125 and a resistor 126 for integrating the rectified output so as to extract a fluctuation 34 of the high frequency components 31. The circuitry also has a comparator 87 for comparing the fluctuation 34 of the output amount detection signal with a preset fluctuation limit 36. When the fluctuation 34 is higher than the limit 36, a low level signal 18 which indicates that an abnormal state has been detected is applied to a latch circuit 127. The latch circuit 127 generates and then holds a low level latch signal in response to the low level signal 18. In this state, since the output of the comparator 57 cannot pass through a gate 119, a power supply comes to be suspended.

Also disclosed in FIG. 5 and its associated description of the Tokkai-2001-15827, a circuitry which detects an output voltage of a voltage boosting type chopper DC source 49 for feeding a push-pull type inverter to produce a chopper output voltage signal 52, and suspends the chopper DC source 49 when the chopper output voltage signal 52 has been off the upper or lower limitation preset for the push-pull type inverter.

That is, the device of the Tokkai 2001-15827 detects an output voltage of the voltage boosting chopper type DC power supply 49 by the diode 50 and capacitor 51, and generates the chopper output voltage signal 52. When an excessive electric power has been consumed due to the abnormal discharge and the like, the chopper output voltage signal 52 fails to reach a target defined by a dividing ratio according to two resistors 101 and 102. In this occasion, the primary clock signal 63 is suspended and thus the power supply is also suspended. Furthermore, in a case of the abnormal discharge whereat a target power fails to be consumed, the primary clock signal 63 fails to be generated, and thus the power supply is also suspended.

Furthermore, the Tokkai-2001-15827 describes that the circuitry of FIG. 5 may further incorporate therein the resistor 120, the diode 121 and the abnormal discharge detection circuit 14, as shown in FIG. 7, so that it is possible to deactivate a transistor 106 when the output of the comparator 27 is in a low level, too.

1: Disadvantages in the circuitry of FIG. 7 and its associated descriptions of the Tokkai 2001-15827:

The circuitry can carried out a protection operation if an abnormal discharge is developed even in a no-load state. However, since the protection operation is carried out after that the insulation of the harness, or the high frequency generator had been damaged, not only the protection operation is uneconomical, but also the risk is too high. Moreover, when an abnormal discharge occurs during the discharge lamp works, the device of the Tokkai 2001-15827 is difficult to carry out a sufficient protection. This is because the device of the Tokkai 2001-15827 is constructed to compare the fluctuation 34 of the output amount detection signal with the preset fluctuation limit 36 by the comparator 87, and then carries out the protection operation at only when the fluctuation 34 of the output amount detection signal is higher than the fluctuation limit 36. Therefore, in the device of the Tokkai 2001-15827 when a minute abnormal discharge current flows the fluctuation 34 of the output amount detection signal becomes small and thus fails to exceed the fluctuation limit 36 and thus fails to carry out the protection operation. By the way, according to an afterthought of the Tokkai 2001-15827, it would be possible to think that the fluctuation limit 36 of the output amount detection signal is free to be brought closer and closer to zero. However, it is clear that such a thought is far from the design concept of the Tokkai 2001-15827, and thus the thought is too formidable. Furthermore, as the device of the Tokkai 2001-15827 integrates the output of the HPF 29 by the integrator comprised of the capacitor 125 and the resistor 28 after that it has been rectified in the diode 124, there is a disadvantage of that the protection operation will be lagged due to the time constant of the integrator.

On the other hand, there is a case that a minute abnormal discharge current may flow in similar to the case of the abnormal discharge occurring between the said polarity points. Since this type of abnormal discharge also has the risk of smoking or firing, it is necessary to carry out a protection operation in similar to the case where a large abnormal discharge current flows.

2: Disadvantages in the circuitry of FIG. 5 and its associated descriptions of the Tokkai 2001-15827:

Although the circuitry is able to detect an overload state and a low load state since it detects a DC output voltage of the voltage boosting type chopper DC source 49 to produce the chopper output voltage signal, it fails to exclusively detect the abnormal discharge. Therefore, since the circuitry of the Tokkai 2001-15827 fails to distinguish a dimming or a high output lighting of the discharge lamp from the abnormal discharge, the circuitry will uniformly suspend the power supply in any case of them. For this reason, the circuitry of the Tokkai 2001-15827 cannot satisfy the demand of lighting a discharge lamp at a various modes.

3. Disadvantages in the circuitry of FIG. 5 of the Tokkai 2001-15827 which integrates therein a part of FIG. 7:

This circuitry is of detecting an abnormal discharge by using two detectors in parallel to carry out a detection operation. Therefore, not only the circuitry is complicated, but also the afore-mentioned disadvantages exist together, without resolved. Thus, the circuitry still fails to correctly detect and protect the abnormal discharge.

SUMMARY OF THE INVENTION

The present invention has an object to provide a discharge lamp lighting apparatus and a lighting appliance employing the same which is able to not only quickly protect against an abnormal operation, but also automatically return to the normal operation when the cause of the abnormal operation has been dissolved.

In particular, the present invention has an object to provide a discharge lamp lighting apparatus and a lighting appliance employing the same which is able to not only quickly protect against a no-load, but also automatically return to a normal operation when the no-load has been dissolved by placing the discharge lamp normally.

Further, particularly, the present invention has an object to provide a discharge lamp lighting apparatus and a lighting appliance employing the same which is able to protect against a weak abnormal discharge, but also automatically return to a normal operation when the abnormal discharge has been dissolved by exchanging the discharge lamp.

Further, particularly, the present invention has an object to provide a discharge lamp lighting apparatus and a lighting appliance employing the same which is able to not only quickly protect an overcurrent, but also automatically return to a normal operation when the overcurrent state has been dissolved.

A discharge lamp lighting apparatus according to a first aspect of the present invention includes, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting the high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller for controlling said switching device of the high frequency generator in a feedback manner for a normal operation state in response to the high frequency operation detection signal applied thereto so that the high frequency operation detection signal becomes around a first level in a normal operation state, while carrying out a protection operation when the high frequency operation detection signal applied thereto has changed to a second level, and a no-load detector for detecting a no-load condition of the secondary winding of the output transformer and forcefully changing the high frequency operation detection signal supplied to the controller to the second level.

This aspect of the invention defines a configuration for detecting the no-load condition and carrying out the protection.

In the following descriptions, some definitions and their technical meanings are presented for following specific terms, unless otherwise specified.

Discharge Lamp

The discharge lamp is provided with at least a discharge vessel, a discharge agent and a pair of electrodes. At least one of the electrodes is placed on the outer surface of the discharge vessel and the inert gas-dominated discharge agent filled in the discharge vessel. Thus the discharge lamp has a configuration for inducing a so-called dielectric barrier discharge.

Discharge Vessel

The discharge vessel can be made of any dielectric material if limited in that the material has a sealing performance and heat-resistance at a working temperature. However discharge vessel is typically made of a soft glass, a hard glass or a semi-hard glass. In case of a discharge lamp wherein a visible radiation is used for lighting, the discharge vessel is enough to exclusively transmit the visible radiation therethrough. While, in case of a discharge lamp wherein an ultraviolet radiation is used for lighting, a discharge vessel such as a silica glass etc. having an ultraviolet radiation transmission property can be used for the discharge vessel. Herein the term "lighting" means whole the things of using radiations from discharge lamps.

Here, the shape of the discharge vessel is not limited. That is, the discharge vessel may have any shape required in response to the application of the lighting. For example, the discharge vessel may be a tubular one, a planer one and the like. Further, the term "tubular" means either of a straight-shape tube and a bent-shape tube. Further, the bent-shape may be a toroidal shape, a semi-toroidal shape, a U-letter shape, a W-letter shape, a saddle-shape or a spiral shape. Furthermore, in case of a tubular shape discharge lamp, the size and the length of the tubular shape can be arbitrarily designed in accordance with a practical usage.

Discharge Agent

The discharge agent is dominated by an inert gas. Although xenon is preferable for the inert gas, it is also possible use any one of or a mixture of two or more of krypton, argon, neon and helium for the inert gas. Here, the term "inert gas-dominated discharge agent" allows that the discharge agent contains a halogen in addition to the inert gas which dominates in the discharge agent.

Electrode

In a pair of electrodes, at least one of the electrodes is placed on the outer surface of the discharge vessel. Hereinafter, the electrode placed on the outer surface of the discharge vessel is referred to as an outer electrode, and the other electrode placed in the discharge vessel is referred to as an inner electrode, for the sake of convenience. As an arrangement of a pair of the electrodes, there are two options available. That is, in one arrangement two electrodes may be provided as outer electrodes. While in another arrangement one electrode may be provided as an outer electrode and the other electrode may be provided as an inner electrode. When at least one of the electrodes is provided as the outer electrode, a capacitance presents between two electrodes facing each other via the wall of the discharge vessel as a dielectric. Thus a dielectric barrier discharge may be induced due to such a construction.

The outer electrode is placed on or almost in touch with the outer surface of the discharge vessel. The outer electrode is preferably made of a conductive thin film. As such a conductive thin film, a conductive metal foil such as an aluminum foil, a silver foil and a copper foil, a conductive metal film evaporated on a light-transmissive plastic sheet, a metalized film, a conductive metal film, a conductive paste film prepared by a screen printing technique, an ITO film, an NESA film etc. are available. When forming the outer electrode by a conductive thin film, it may be shaped into a ribbon, or may have a hetero-shape such as a wave shape. The actual condition of the outer electrode is not limited to the conductive thin films. For example, if needed, the outer electrode may be a coil, a mesh etc. made of conductive material and be placed on or almost in touch with the outer surface of the discharge vessel. Here, the term "placed . . . almost in touch with . . . " means that although it is preferable that the whole of the outer electrode is placed in touch with the outer surface of the discharge vessel, it is not an indispensable condition and that all in all the outer electrode may be placed in touch with the outer surface of the discharge vessel. Further, the outer electrode is able to have a size that at least a part of the outer electrode may extend in the longitudinal or axial direction of the discharge vessel. And in the circumferential direction of the discharge vessel the outer electrode may extend all around the discharge vessel or within a limited arc range along the discharge vessel.

Furthermore, if the outer electrode is worked into a coil or a mesh, or made of light-transmissive conductive film, such an electrode allows the light emitted in the discharge vessel be derived outside through the outer electrode. Thus such an outer electrode can be placed all around the discharge vessel. On the other hand, if the outer electrode made of metal foil is used, the metal foil is affixed in advance to the one side of a light-transmissive plastic sheet as described later in detail, and then the light-transmissive plastic sheet is stuck at its other side on the outer surface of the discharge vessel with adhesive coated on the other surface of the light-transmissive plastic sheet. However it is also possible to directly stick a metal foil on the outer surface of the discharge vessel. Further, the width of the outer electrode may vary in the axial direction of the discharge vessel.

Next, to make the outer electrode contact with the outer surface of the discharge vessel an adhesive is coated in advance on a mating surface of the outer electrode, the outer electrode is adhered to the discharge vessel with the adhesive. However, it is also possible to coat an adhesive on a surface of the discharge vessel to be mated with the outer electrode and then affix the outer electrode on the surface to be mated. Further, it is also possible to just put the outer electrode on the discharge vessel without using any adhesive, and then wrap a light-transmissive plastic sheet coated with an adhesive all round the discharge vessel.

Now an arrangement of the pair of the electrodes to the discharge vessel will be described. As to the arrangement of the pair of the electrodes there are a variety of type as described below, and any type can be arbitrarily selected from them.

A pair of electrodes may be placed either inside or outside the discharge vessel if at least one of them is placed so that a discharge occurs inside the discharge vessel in the aid of a discharge agent.

1. Inner and outer electrodes arrangement:

This type of arrangement includes a set electrodes comprised of one or more inner electrodes and one or more outer electrodes. This type of arrangement is further divided into two types, i.e., a type of the inner electrode having a short-length and a type of the inner electrode having a long-length extending along the longitudinal direction of the discharge vessel.

(1) Electrodes arrangement including short-length inner electrode:

In this electrodes arrangement, there is used a short-length inner electrode which is similar to the electrode used in conventional inner-electrode type fluorescent lamps.

(1-1) Electrodes arrangement wherein single inner electrode is placed on one end of discharge vessel and single outer electrode is placed on outer surface of discharge vessel:

(1-2) Electrodes arrangement wherein a pair of inner electrodes are placed on both ends of discharge vessel and single outer electrode is placed on outer surface of discharge vessel:

In this electrode arrangement (1-2), a pair of inner electrodes are commonly connected to one terminal of lighting circuits and the outer electrode is connected the other terminal, or a pair of inner electrodes are separately connected to each one terminal of a pair of lighting circuits and the outer electrodes are commonly connected to the other terminals at the same potential.

(1-3) Electrodes arrangement wherein a pair of inner electrodes are placed on both ends of discharge vessel and a pair of outer electrodes are placed on outer surface of the discharge vessel:

In this electrode arrangement (1-3), inner electrode and outer electrode face each other in one-to-one correspondence.

(1-4) Electrodes arrangement wherein three inner electrodes are placed on both ends and in the middle of the discharge vessel and single long-length outer electrode faces them in common:

(1-5) Electrodes arrangement wherein three inner electrodes are placed on both ends and in the middle of the discharge vessel and three outer electrodes are placed on the outer surface of the discharge vessel in respectively facing with the inner electrodes:

(2) Electrodes arrangement including long-length inner electrode:

In this electrodes arrangement, there is used a long-length inner electrode extending over the substantial whole length of the discharge vessel.

In this electrodes arrangement, there are two types. One is that both ends of the inner electrode are exposed outside the discharge vessel by hermetically passing through the ends of the discharge vessel. The other is that one end of the inner electrode is exposed outside the discharge vessel by hermetically passing through one end of the discharge vessel, and the other end of the inner electrodes is placed inside the discharge vessel in proximity to the other end of discharge vessel.

2. Outer electrodes arrangement:

In this electrodes arrangement, the pair of outer electrodes are placed on separated portions of the outer surface of a discharge vessel in facing with each other across discharge vessel. As to the outer electrodes, a pair or plural pairs of them can be arranged along the longitudinal direction of the discharge vessel. Here, in a so-called aperture type discharge vessel, the outer electrodes must be placed on positions where they do not substantially block the light emission through the aperture.

Fluorescent Substance Layer

Although such a fluorescent substance layer is not indispensable for the discharge vessel of the present invention, the fluorescent substance layer can be formed on the inner surface of the discharge vessel as needed. The fluorescent substance may be freely selected from a variety of known fluorescent substances according to practical usages of discharge lamps. For example, in a color scanner usage, a three band emission fluorescent substance can be used. Further, in a monochrome scanner usage, a green-light emission fluorescent substance can be used. Here, the term "the fluorescent substance layer can be formed on the inner surface of the discharge vessel" means that not only the fluorescent substance layer can be directly formed on the inner surface of the discharge vessel, but also the fluorescent substance layer can be formed on a guard film which is formed in advance on the inner surface of the discharge vessel.

High Frequency Power Source

A high frequency generator is an apparatus for inducing a dielectric barrier discharge by supplying a high frequency energy with desirable voltage and power to the discharge lamp. Further, limited only by a switching device for generating a high frequency voltage by switching operation at a high frequency and an output transformer for outputting the high frequency voltage so as to supply to the discharge lamp through a pair of electrodes with the high frequency voltage induced across a secondary winding of the output transformer in order to drive lighting of the discharge lamp, other configurations are not limited in the high frequency generator. Here, in this application, the term "high frequency" means a frequency of 1 kHz or higher, or more preferably, a frequency of about 4 to 200 kHz. The high frequency generator can be provided with a resonant circuit for generating a sinusoidal-wave current, as needed. In this case, the resonant frequency is set to a value higher than an operation frequency for operating stably in a phase-lag range. For example, when the operation frequency is 70 kHz, the resonant frequency us set at around 500 kHz. The high frequency energy to be supplied to the discharge lamp would be either of a pulse wave or a continuous wave. Here, the term "continuous wave" means that positive states and negative states alternate in succession without a pause period. The positive states and the negative states may be either of symmetrical or asymmetrical in the continuous wave. For instance, by superposing harmonics on a fundamental sine-wave, the rising edge and the lowering edge of the voltage waveform can become relatively steep. Or by superposing a DC voltage on a fundamental sine-wave, the continuous wave may become asymmetrical. When a high frequency AC voltage is so adjusted that the lamp current having an enough pause period flows the lamp, it is possible to induce an afterglow in the discharge lamp during the pause period of the lamp current the same as the case of applying pulse voltage.

An inverter or a switching regulator is generally used as a circuit for generating high frequency. However, the circuit is not limited to such ones. For example, the high frequency generator could be comprised of an oscillator and a power amplifier.

The output transformer isolates the DC conduction between the primary winding and the secondary winding. The transformer may include a tertiary winding, additional primary windings or additional secondary windings further to the fundamental primary and secondary windings. Further, since the discharge lamp induces the dielectric barrier discharge by applying across the pair of electrode with a voltage induced across the secondary winding of the output transformer, it is necessary to raise the voltage induced in the secondary winding. Accordingly, it is preferable that the output transformer is a voltage boosting type. However the output transformer can be a voltage lowering type or a voltage equalizing type, if required.

The switching device operates to generate a high frequency by a switching operation. As the switching circuit, a proper circuit such as an inverter or a switching regulator can be employed, if desired. As a result, one or a plurality of switching devices can be used according to a circuit system. Further the switching device is able to use a semiconductor switch such as a MOSFET or a bipolar transistor.

High Frequency Operation Detector

The high frequency operation detector is an apparatus for yielding a high frequency operation detection signal as a feedback signal for making feedback control the switching device of the high frequency generator so as to generate a stable high frequency voltage from the high frequency generator. The signal format of the high frequency operation detection signal is determined according to the type of the feedback control. That is, in a constant-voltage-control mode a high frequency voltage is detected. In a constant-current-control mode, a high frequency current is detected. While, in a constant-power-control mode, both the high frequency voltage and the high frequency current are detected. Any of the high frequency voltage and the high frequency current can be detected at the primary side or the secondary winding of the output transformer. Here, since the high frequency voltage is detected by typically using a boosting transformer, when considering a miniaturization of the transformer it is better to make the detection at the primary side of the output transformer.

When the high frequency voltage and the high frequency current are detected by controlling the constant power, they may be detected independently, or they may be commonly detected by using single detection circuit. Here, as an actual configuration of the detection circuit a variety of known devices could be used without being specifically limited.

Controller

Controller controls a feedback control and a trouble-shooting. The feedback control is applied for the switching operation of the switching device which makes the high frequency means to generate a high frequency during a normal operation. The latter control, i.e., the trouble-shooting is a protection for the switching operation of the switching device at an abnormal time. A section making the feedback control and a section making the trouble-shooting could be independently constructed. Or they could be so constructed that they are centrally controlled, by being comprised of an IC such as a switching regulator IC as its key component.

Further, the controller makes a feedback control during normal operation in that the high frequency operation detection signal is in the first level. The feedback control is an operation for keeping a voltage, a current or a power in constant by controlling the switching operation of the switching device in a PWM control fashion, a frequency control fashion or a voltage control fashion by means of feeding back the voltage, the current or the power of the high frequency output for driving a discharge lamp. Further the controller makes a prescribed protecting operation during abnormal operation wherein the high frequency operation detection signal takes a second level. Here, the term "first level" means any level other than a second level as mentioned later. Further, the term "protecting operation control" means an action of controlling protecting operations for preventing danger due to an abnormal discharge, such as suspending the high frequency generation, making intermittently the high frequency generation or making the high frequency generation at a lowered voltage. Furthermore, the term "abnormal time" means principally the time that the high frequency generator operates in a no-load condition.

The controller could be configured to suspend the protecting operation for a predetermined time at the starting of the discharge lamp. Since in this sort of discharge lamp an extremely high voltage is applied thereto on starting, and also an abnormal discharge differing from a primary discharge occurring through a discharge agent is apt to occur for a short time, it is able to carry out a reliable protecting operation by avoiding a transient time such as the starting time.

No-load Detector

A no-load detector detects a no-load condition of the secondary winding of the output transformer. In addition, it forcefully changes the high frequency operation detection signal which is supplied to the controller into the second level. Whether the secondary winding of the output transformer is in the loaded state or the unloaded state during the operation of the high frequency generator is possible to be detected either by the voltage or the current on the secondary side of that the output transformer or the by the condition such as the temperature or the light of the discharge lamp which is loaded. In this aspect of the invention, any of them can be used for the detecting operation.

The high frequency operation detection signal supplied to the controller when the no-load condition is detected is forcefully changed to the second level by lowering the level of the high frequency operation detection signal such as shorten or cut off one part or entire part of the high frequency operation detection signal in the high frequency operation detector with a switch. On the contrary, the level could be increased by increasing the high frequency operation detection signal. That is, the term "second level" is a level that is electrically judicable and apparently different from one of the high frequency operation detection signal during normal operation.

Operation

In this aspect of the invention, when the no-load detector detects the no-load condition on the secondary winding of the output transformer, it forcefully changes the high frequency operation detection signal which is supplied to the controller from the first level to the second level, so as to control the switching device for generating high frequency in the high frequency generator to carry out protecting operation. Accordingly, it is possible to speedily carry out a suitable protecting operation.

Further, since the protecting operation is carried out by forcefully changing the level of the high frequency operation detection signal to be supplied to the controller so that the signal is used for the feedback control during normal operation, the discharge lamp lighting apparatus will be simple in its circuitry and comparatively less-expensive.

The discharge lamp lighting apparatus according to a second aspect of the invention is comprised of, a discharge lamp provided with a discharge vessel filled with an inert gas-dominated discharge agent and a pair of electrodes at least one of which is placed on the outer surface of said discharge vessel, a high frequency generator provided with a DC supply, an output transformer connected across the terminals of the DC supply and a switching device connected in series with the primary winding of the output transformer for constituting a primary side circuit, a high frequency operation detector for generating a high frequency operation detection signal by detecting at least one of a high frequency voltage or a high frequency current on a primary winding of the output transformer, a controller comprised of a regulator IC with a shutdown function for controlling said switching device of the high frequency generator in a feedback manner for a normal operation state in response to the high frequency operation detection signal applied thereto so that the high frequency operation detection signal becomes approximately a first level, while controlling the switching device of the high frequency generator so as to carry out a protection operation by operating the shutdown function when the high frequency operation detection signal has changed to a second level, and a no-load detector for detecting a lamp current flowing through the discharge lamp and also for changing the high frequency operation detection signal supplied to the controller to be the second level when the lamp current is not detected.

This aspect of the invention defines a configuration for making protecting operation by detecting a no-load condition in similar to the first aspect of the invention.

High Frequency Power Source

The high frequency generator is provided with a DC power source, an output transformer and a switching device. The DC power source may be either of an AC-to-DC rectified power source which rectifies an AC power into a DC power or a battery. The switching device generates a high frequency by switching the DC voltage at a high frequency. The output transformer Transmits a high frequency energy from the primary side to the secondary side with an isolation of DC conduction between the primary side and the secondary side.

Controller

The controller is comprised of a regulator IC with a shutdown function. The shutdown function acts at a time that the high frequency operation detection signal has moved to the second level. Accordingly, the regulator IC is able to make a feedback control during the normal operation and the protecting operation control during the abnormal operation of the switching device.

No-load Detector

The no-load detector is an apparatus for detecting a no-load condition by detecting a lamp current flowing through the discharge lamp at the secondary winding of the output transformer. For detecting the lamp current, it is able to adopt a variety of known techniques such as detecting of a voltage drop across an impedance element or a current transformer connected in series with the discharge lamp.

Operation

This aspect of the invention employs the regulator IC with a shutdown function for the main part of the controller. Since the shutdown function suspends generation of the high frequency to carry out the protection operation, the circuitry is free from any hunting associated with the control. Moreover, the control becomes exact and the response becomes faster. In addition, a circuit assembly becomes simplified.

Moreover, since this aspect of the invention is able to detect the non-load state based on a lamp current, it is able to accomplish a superior accuracy of detection and a simple circuitry. Other operations and effects are the same as those of the first aspect of the invention.

A discharge lamp lighting apparatus according to a third aspect of the invention includes, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller comprised of a regulator IC with a shutdown function for controlling said switching device of the high frequency generator in a feedback manner for a normal operation state in response to the high frequency operation detection signal applied thereto so that the high frequency operation detection signal becomes around a prescribed level, while controlling the switching device so as to carry out a protection operation by operating the shutdown function when an abnormal discharge control signal has been applied thereto, and an abnormal discharge detector provided with an abnormal discharge current bypass wherein an abnormal discharge current flowing through the secondary winding of the output transformer is bypassed and a control switch for controlling the switching device to carry out protection by an abnormal discharge control signal applied to the controller of the switching device when a prescribed abnormal discharge current flows through said abnormal discharge current bypass.

This aspect of the invention defines a configuration for carrying out a protecting operation by detecting an abnormal discharge.

Controller

The controller is comprised of a regulator IC with a shutdown function. For this reason, the controller is provided with a shutdown terminal. When the abnormal discharge control signal as mentioned later is applied to the shutdown terminal, a shutdown function operates to control the switching device of the high frequency generator and then suspend the high frequency generating operation. Therefore, the Regulator IC carries out a feedback control at the normal operation of the switching device, and the protection operation when an abnormal discharge has occurred.

Abnormal Discharge Detector

If an abnormal discharge occurs upon lighting of the dielectric barrier discharge lamp, an abnormal discharge current with a pulse rising edge (pulse falling edge) steeper than that of a normal lamp current and a peak value larger than that of the normal lamp current flows. In the high frequency output current of the high frequency generator at the time higher order harmonics are superposed on the pulse rising edge (pulse falling edge). These harmonics have a frequency of 50 MHz or more. Here, the term "abnormal discharge" means a several aspects of discharge phenomena, as principally described below.

1. A discharge occurring between two electrodes placed on the outer surface of the discharge vessel, 2. A discharge occurring between two electrodes due to a breakdown of an insulation of a harness wire for feeding power, 3. A discharge occurring between two electrodes due to a crack of soldering to a high-voltage output connector pin of the high frequency generator, 4. A discharge occurring between two electrodes due to a deterioration of an high-voltage output pattern on a print circuit board of the high frequency generator;

5. A discharge occurring between two electrodes due to an insulation deterioration of the output transformer in the high frequency generator;

6. A discharge occurring around a break broken in the middle of the outer electrode; and 7. A discharge occurring between an outer electrode and its terminal-lead.

In this aspect of the invention, the abnormal discharge detector is provided with an abnormal discharge current bypass and a control switch.

A bypass circuit bypasses the higher order harmonics component of abnormal discharge current flowing through the secondary winding of the output transformer. As a result, only the steep pulse rising edge of the abnormal discharge current, i.e., the higher order harmonics current is selected. For the bypass circuit for bypassing the higher order harmonics current, a high pass filter which passes therethrough frequency components of, e.g., 50 MHz or more can be employed. Moreover, the bypass circuit generates an abnormal discharge detection signal, upon detecting an abnormal discharge current.

The switching device carries out a switching operation based on an abnormal discharge detection signal to generate an abnormal discharge control signal. This abnormal discharge control signal is applied to the shutdown terminal of a controller. This control signal calls a shutdown protection operation for the controller.

In this aspect of the invention, when an abnormal discharge has occurred, the abnormal discharge current bypass bypasses the abnormal discharge current. The control switch then detects the bypass current. Following the bypass current detection, the control switch then calls a protecting operation for the controller of the switching device by supplying the abnormal discharge control signal thereto. Accordingly, as the controller shuts down the switching operation of the switching device, the high frequency generator quits its operation of generating the high frequency. Thus the protecting operation is carried out.

As will be understood from the above description, in this aspect of the invention the bypass circuit exclusively bypasses, once an abnormal discharge has occurred, a higher order harmonics current to generate an abnormal discharge detection signal regardless of the lamp current, unlike the operation of the circuitry of the Tokkai 2001-15827 to detect an abnormal discharge when the fluctuation is higher than a preset limit. That is, even a minute abnormal discharge occurring between the said polarity points, it is quickly detected. Since the switching produces the abnormal discharge control signal in response to an abnormal discharge detection signal, it is able to quickly carry out the protection operation.

As this aspect of the invention exclusively detects an abnormal discharge regardless of the lamp current of the discharge lamp, if the discharge lamp is lighted at a low power for dimming the discharge lamp or lighted at a high power, the abnormal discharge detector operates without malfunction. Therefore, since the discharge lamp can be lighted in the various modes, this aspect of the invention is adaptable for wide applications.

As the controller is comprised of a regulator IC with a shutdown function, and since the shutdown function suspends generation of the high frequency to carry out the protection operation, the circuitry is free from any hunting associated with the control. Moreover, the control becomes exact and the response becomes faster. In addition, a circuit assembly becomes simplified.

A discharge lamp lighting apparatus according to a fourth aspect of the invention includes, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller for controlling said switching device of the high frequency generator in a feedback manner for a normal operation state in response to the high frequency operation detection signal applied thereto so that the high frequency operation detection signal becomes around a prescribed level, while controlling the switching device of the high frequency generator so as to carry out a first protection operation when the high frequency operation detection signal has changed to a second level or a second protection operation when an abnormal discharge control signal has been applied thereto, a no-load detector for detecting a no-load condition of the secondary winding of the output transformer and forcefully changing the high frequency operation detection signal supplied to the controller to the second level, and a current detector provided with a current detecting element for detecting a current flowing through the primary side of the output transformer and an impulse bypass capacitor connected in parallel with said current detecting element, for supplying a current detection signal to the controller.

This aspect of the invention defines an apparatus for detecting a no-load state and an abnormal discharge to correctly protect against them. For example, when a no-load state is detected, a first protection operation of reducing or reversibly suspending the high frequency output is carried out. On the other hand, when an abnormal discharge is detected, a second protection operation of unreversibly suspending the high frequency output is carried out. However, both the first and the second protection operations can be made to carry out a protection to reversibly suspend the high frequency output, as needed.

For the operations of detecting and protecting a no-load state, the first and second aspects of the invention can be employed. Moreover, for operations of detecting and protecting an abnormal discharge, the configuration of the third aspect of the invention can be employed. However, by making the third aspect of invention to detect a high frequency current by the no-load detector, the current detector used in this aspect of the invention can be shared with the abnormal discharge detector. Therefore, the third aspect of the invention can avoid a complication of circuitry. In this case, the no-load detector and the abnormal discharge detector can be provided with a diode for preventing an undesired signal superimposition between the detectors.

Moreover, the controller may be or may not be provided with the regulator IC with the shutdown function.

As this aspect of the invention can detect both the no-load state and the abnormal discharge to protect them, it is able to provide a useful lighting apparatus for the dielectric barrier discharge lamp.

A discharge lamp lighting apparatus according to a fifth aspect of the invention includes, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller for controlling said switching device of the high frequency generator in a feedback manner for a normal operation state in response to the high frequency operation detection signal applied thereto so that the high frequency operation detection signal becomes around a prescribed level, while controlling the switching device of the high frequency generator so as to carry out a protection operation when the high frequency operation detection signal has exceeded a prescribed level, and a current detector provided with a current detecting element for detecting a current flowing through the primary side of the output transformer and an impulse bypass capacitor connected in parallel with said current detecting element, for supplying a current detection signal to the controller.

This aspect of the invention defines a configuration for carrying out a protecting operation by detecting an overcurrent.

If, for example, the primary winding of the output transformer has a large stray capacitance, an impulse occurs due to a transient oscillation which arises at an instant that the switching device has been turned ON. When such an impulse occurs, the overcurrent detector fails to work properly and thus resulting in an unintended protecting operation.

Accordingly, in this aspect of the invention, the impulse contained in the current detection signal is suppressed before the current detection signal is supplied to the controller. That is, the current detector is provided with a current detecting element and an impulse bypass capacitor. The current detecting element, which is comprised of a resistor with a low resistance, detects a current flowing in the primary side of the output transformer. Accordingly, the current detecting element is easily isolated, and the circuitry thereof is simplified. The impulse bypass capacitor is connected in parallel with the current detecting element. The term "in parallel" includes such a direct parallel connection fashion and an indirect parallel connection fashion in which a current detecting element is connected via a voltage divider. The impulse contained in the current detection signal is removed by bypassing through the impulse bypass capacitor. Thus, an impulse-free current detection signal is supplied to the controller.

Thus, in this aspect of the invention, even if an impulse due to a stray capacitance of the primary side of the output transformer is contained in the current detection signal, the overcurrent detector does not fail to work properly.

A discharge lamp lighting apparatus according to a sixth aspect of the invention is characterized in that the output transformer as defined in the first to fourth aspects of the invention has a multiplayer primary winding.

This aspect of the invention defines a configuration that the stray capacitance of the primary winding of the output transformer is reduced. That is, in order to reduce the stray capacitance, the number of turns of the primary winding is lessened. However, if only the number of turns is lessened, the inductor is reduced, so as to disturb a required voltage transform operation. However, the stray capacitance of the winding varies in proportion to a number of turns of adjacent winding. Accordingly, the number of turns of the primary winding of the output transformer is maintained to be a required numbers by making it a multi-winding, in addition, the number of turns of adjacent winding is lessened, so that the stray capacitance is remarkably reduced.

Further, in this aspect of the invention, the inductor on the primary side of the output transformer is preferable to be up to 30 mH. The number of layers of the primary winding may be two or more.

Since such an occurrence of the impulse due to a stray capacitance of the primary winding lowers according to this aspect of the invention, it is effective to prevent a malfunction of the abnormal detector for detecting abnormal condition such as an overcurrent.

A discharge lamp lighting apparatus according to a seventh aspect of the invention is characterized in that it is provided with a timer in addition to the first through sixth aspects of the discharge lamp lighting apparatus. Therefore, this aspect of the invention is characterized in that it suspends the protection operation of the controller for a predetermined period at the starting of the discharge lamp.

The timer is enough to start at a proper timing in the starting operation. For example, the timer can start in synchronization with the timing that the high frequency generator is turned ON.

Since a dielectric barrier discharge lamp is started by being supplied with a power of a high voltage and a high frequency, the abnormal discharge detector tends to work improperly due to the high voltage with a high frequency. Moreover, an abnormal discharge tends to occur along an outer surface of the discharge vessel due to the starting high voltage, before a normal dielectric barrier discharge occurs through the discharge agent in the discharge vessel. Therefore, there is a possibility of that an unstable phenomenon may transitionally occur for a predetermined period at the time of starting. In a discharge lamp whose lamp voltage is so increased to have a high output by relatively increasing a pressure of the discharge agent so as to increase the impedance of the lamp, there is a possibility of that such an unstable phenomenon may transitionally occur.

Since the timer in this aspect of the invention suspends the protection operation of the controller for a predetermined period at the starting of the discharge lamp, undesired protection operations due to a malfunction can be prevented.

A lighting apparatus according to an eighth aspect of the invention includes, a lighting apparatus main body, and a discharge lamp lighting apparatus as defined in the first to seventh aspects which is provided with the lighting apparatus main body.

This aspect of the invention is provided with a discharge vessel wherein a discharge agent which is made of inert gas as its key constituent is hermetically filled and a pair of electrodes at least one of which is placed on the outer surface of the discharge vessel. It is applied to any apparatus for the purpose of using emission of the discharge lamp that is connected to the output terminal of the discharge lamp lighting apparatus.

The term "lighting apparatus main body" means a almost entire portion of the lighting apparatus except the discharge lamp lighting apparatus.

As the apparatus, there are for instance, a lighting equipment, an image readout device, a facsimile, a scanner or a copying machine which are installing the image readout device in, a back light device of a liquid crystal display, and an indicator on a car.

More particularly, in the discharge lamp according to this aspect of the invention, since at least one set of electrodes is placed on the outer surface of the discharge vessel, a configuration that a discharge light is derived through the slit left between the electrodes is easily adopted. Thus the discharge lamp is preferable for the image readout device or the back light device. However, if the outer electrode is made light-transmissive or the outer electrode defines therein a gap which allows a discharge light to pass therethrough, the discharge light is derived from the discharge lamp omnidirectionally. Such an omnidirectional construction is advantageous for designing a easy-to-use lighting equipment.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the attached drawings FIGS. 1 to 20, a number of preferred embodiments according to the present invention will be explained.

Figure 1:
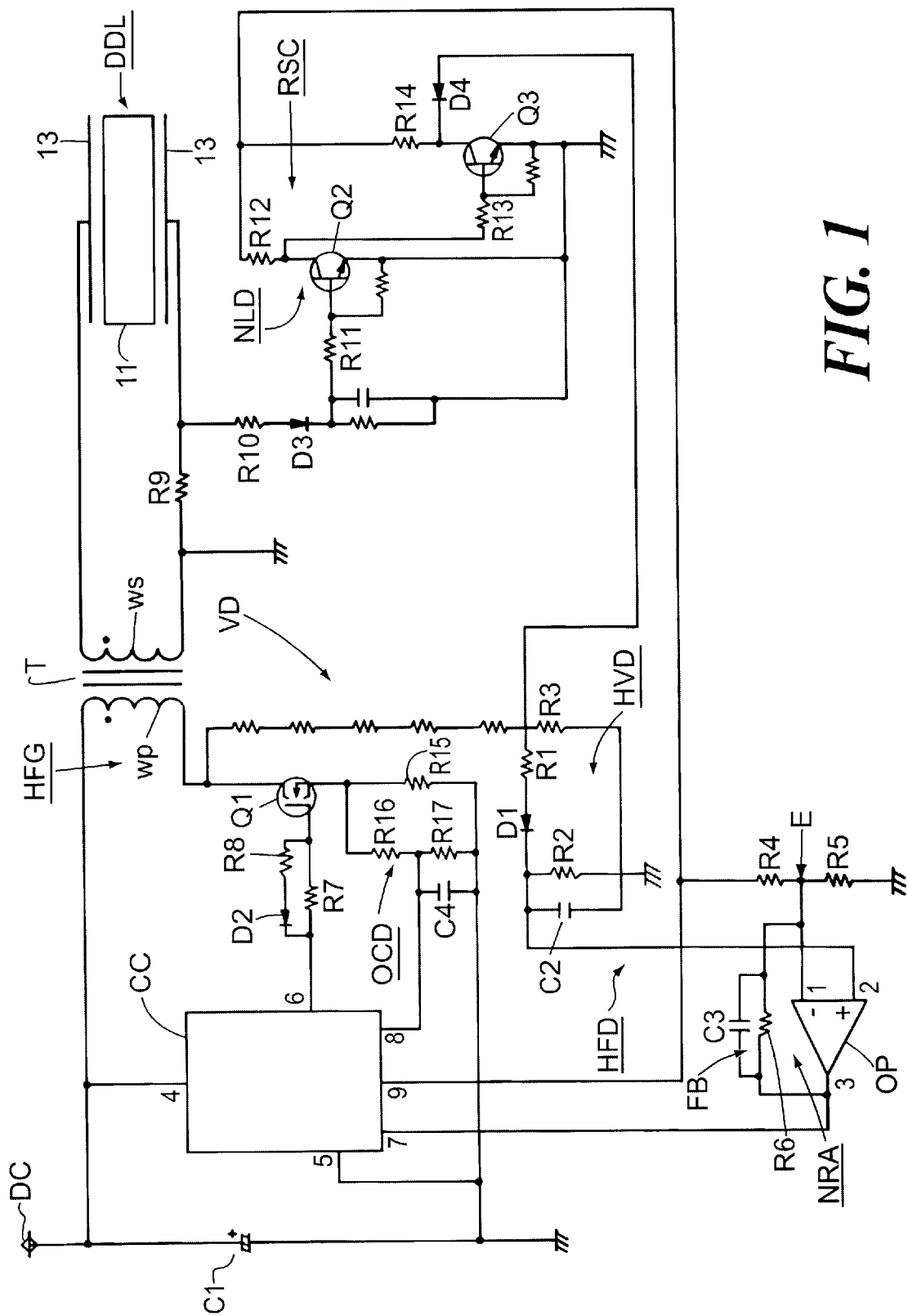
FIG. 1 is a schematic circuit diagram showing a first embodiment of the discharge lamp lighting apparatus according to the present invention.

FIG. 1 is a schematic circuit diagram showing a first embodiment of the discharge lamp lighting apparatus according to the present invention.

Figure 2:
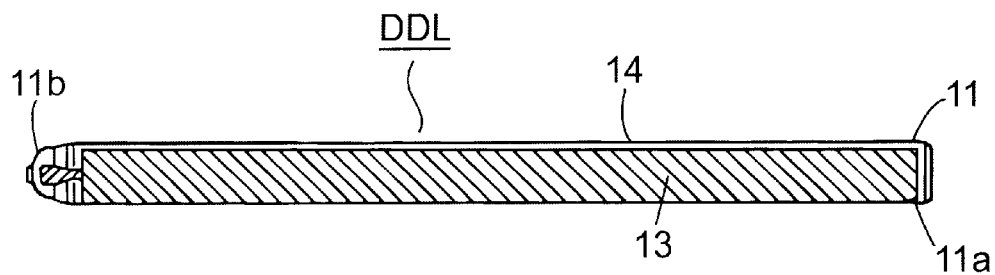
FIG. 2 is a front view of the discharge lamp of the first embodiment.

FIG. 2 is a front view of a discharge lamp of the discharge lamp lighting apparatus.

Figure 3:
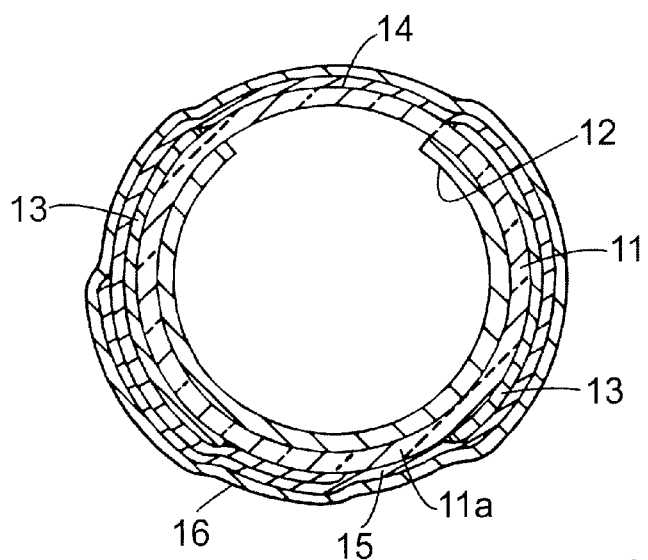
FIG. 3 is an enlarged cross-section of the discharge lamp of the first embodiment.

FIG. 3 is a cross-section of the discharge lamp of the discharge lamp lighting apparatus.

Figure 4:
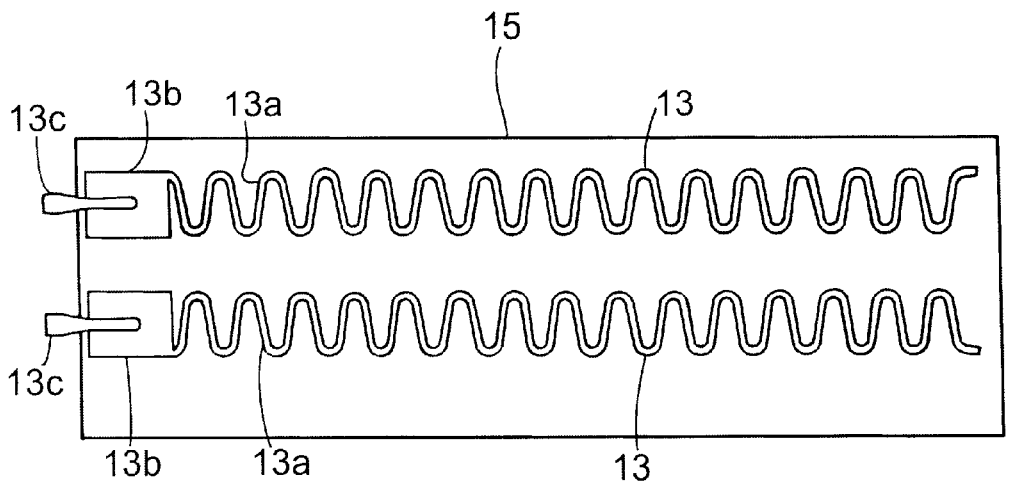
FIG. 4 is a developed view of outer electrodes and a light-transmissive plastic sheet of the discharge lamp of the first embodiment.

FIG. 4 is a developed view of outer electrodes and a light-transmissive plastic sheet of the discharge lamp of the discharge lamp lighting apparatus.

In FIG. 1, DC denotes a DC supply, HFG denotes a high frequency generator, DDL denotes a discharge lamp, HFD denotes a high frequency operation detector, CC denotes a controller, NLD denotes a no-load detector, and OCD denotes an overcurrent detector.

DC Power Source DC

The DC power source DC supplies a DC power obtained by rectifying and then smoothing a commercial AC power. The DC power source DC is connected across a smoothing capacitor C1 at its ungrounded and grounded terminals.

High Frequency Generator HFG

The high frequency generator HFG is comprised of a switching regulator, which is provided with a voltage boosting type output transformer T and a switching device Q1. The output transformer T is configured as an insulation type provided with a primary winding wp and a secondary winding ws. The primary winding wp and the secondary winding ws are associated to each other at the polarity relationship as shown by dot symbols in FIG. 1. The switching device Q1 is comprised of a MOSFET. A series circuit of the primary winding wp of the output transformer T and the switching device Q1 is connected across the DC power source DC through terminal thereof.

The high frequency generator HFG generates a high frequency pulse voltage and supplies the pulse voltage to the output transformer T across the secondary winding ws, thereby the operation of the switching device Q1 being controlled with the controller CC, as described below.

Discharge Lamp DDL

A pair of outer electrodes 13 and 13 of the discharge lamp DDL are connected across the secondary winding ws of the output transformer T. Thus, the discharge lamp DDL is biased by the high frequency generator HFG.

The discharge lamp DDL is comprised of a discharge vessel 11, a fluorescent substance layer 12, the pair of outer electrodes 13 and 13, an aperture 14, a light-transmissive plastic sheet 15, and a light-transmissive insulation tube 16.

The discharge vessel 11 is made of a narrow glass bulb 11 of a diameter of 8 mm and an effective length of 272 mm, and its respective ends are hermetically sealed. Further, the one end of the discharge vessel 11 is provided with an exhaust chip off portion 11b. Furthermore the discharge vessel 11 is filled with a xenon as a discharge agent.

The fluorescent substance layer 12 is formed on the inner surface of the discharge vessel 11 except on a slit extending in the longitudinal direction of the discharge vessel 11.

The pair of outer electrodes 13 and 13, which are made of aluminum foils, have corrugation shapes, as shown in FIG. 4. On the whole, as schematically shown in FIGS. 2 and 3, they are attached to the outer surface of the discharge vessel 11 by confronting with each other in parallel. Then, the outer electrode 13 is placed on a specific position of the discharge vessel 11 on one side of the light-transmissive plastic sheet 15 in advance, and the light-transmissive plastic sheet 15 which is mentioned below is wound around the outer surface of the discharge vessel 11. Accordingly, the outer electrode 13 is defined on a specific position of the discharge vessel 11.

Further, the electrode 13 is comprised of a corrugated electrode key portion 13a, a terminal pad 13b and a terminal 13c. The electrode key portion 13a having a corrugation shape extends over the most part of the discharge vessel 11 in its longitudinal direction. The terminal pad 13b, which is connected to one end of the electrode key portion 13a, is defined in a square shape so as to enlarge the contact area with the terminal 13c. The terminal 13c is bonded to the terminal pad 13b by a conductive adhesive and protrudes outside the light-transmissive plastic sheet 15 and the light-transmissive heat contracting tube 16.

The aperture 14 is formed on the discharge vessel 11 except a slit defined in the fluorescent substance layer 12 along the longitudinal direction of the discharge vessel 11. Accordingly, through the aperture 14 of the discharge vessel 11, the interior of the discharge vessel 11 is seen through a glass bulb 11a.

The light-transmissive plastic sheet 15, which is made of a transmissive PET, has a length extending overall the discharge vessel 11 substantially, and a width covering the aperture 14 to the direction of the around of the discharge vessel 11. As described above, on the light-transmissive plastic sheet 15, the pair of outer electrodes 13 and 13 are attached at a specific distance. And further an acrylic adhesive is applied on them, so that the light-transmissive plastic sheet 15 is attached to the outer surface of the discharge vessel 11. Accordingly, the pair of outer electrodes 13 and 13 are placed on both side of the aperture 14, and thus the light-transmissive plastic sheet 15 is also attached on the aperture 14.

The light-transmissive insulation tube 16, which is made of a transparent fluorine resin, covers entire round of the discharge vessel 11 over the outer electrodes 13 and 13 and the aperture 14.

High Frequency Operation Detector HFD

The high frequency operation detector HFD is comprised of a high frequency voltage detector section HVD and a non-inverting amplifier NRA. The high frequency voltage detector section HVD is comprised of a voltage divider VD, resistors R1 and R2, a diode D1, and a capacitor C2. The voltage divider VD is connected between the connecting node of the primary winding wp of the output transformer T and the switching device Q1 and the ground potential source. The voltage across the resistor R3 is applied to a parallel circuit of the resistor R2 and the capacitor C2 via a series circuit of the resistor R1 and the diode D1.

The high frequency voltage applied to the primary winding wp is divided by the voltage divider VD. A divided voltages across the resistor R3 is rectified in the diode D1, and then integrated by the resistor R2 and the capacitor C2.

The non-inverting amplifier NRA is comprised of an operational amplifier OP, a reference voltage E and a feedback circuit FB. An operational amplifier is provided with an inverted input terminal 1, a non-inverted input terminal 2, and an output terminal 3. To the inverted input terminal 1, the reference potential of the reference voltage E is supplied. To the non-inverted input terminal 2, the output voltage from the high frequency voltage detector section HVD is supplied. The output terminal 3 is connected to a switching control input terminal 7 of a controller described below. The reference voltage E is comprised of a series circuit of resistors R4 and R5 which is connected between the DC power source supplied from the controller CC and the ground potential source. A reference voltage is obtained between both ends of the resistor R5. The feedback circuit FB is established by connecting a parallel circuit of a resistor R6 and a capacitor C3 between the non-inverted input terminal 1 and the output terminal 3.

Controller CC

The controller CC, which is typically constituted by a switching regulator IC with a shutdown function, is provided with a first DC input terminal 4, a ground terminal 5, a gate drive signal output terminal 6, a switching control input terminal 7, an overcurrent control input terminal 8, and a second DC input terminal 9. The first DC input terminal 4 is connected to the DC power source DC, while the ground terminal 5 is connected to the ground potential source. The gate drive signal output terminal 6 is connected to the gate of the switching device Q1 via the resistor R7 and a parallel circuit of the diode D2 and a resistor R8, in series. The switching control input terminal 7 is connected to the output terminal 3 of the non-inverting amplifier NRA as described above. An overcurrent control input terminal 8 is connected to the output terminal of the overcurrent detector OCD as described below. The second DC input terminal 9 is connected to the reference voltage E and the no-load detector NLD as described below, so as to supply the DC power source to them.

No-load Detector NLD

The no-load detector NLD is comprised of a secondary winding's high frequency current detector R9 and a inverting switch circuit RSC. The secondary winding's high frequency current detector R9, which is comprised of a resistor with a low resistance, is connected in series between the secondary winding ws of the output transformer T and the discharge lamp DDL. And, the coupling node of the secondary winding's high frequency current detector R9 and the secondary winding ws is grounded.

The inverting switch circuit RSC is constituted by switches Q2 and Q3 which are comprised of bipolar transistors as its key components. The base of the switch Q2 is connected to the non-grounded terminal of the secondary winding's high frequency current detector R9 via the diode D3 and resistors R10 and R11. While the collector of the switch Q2 is connected to the second DC input terminal 9 of the controller CC via a resistor R12. And the emitter thereof is grounded. The base of the switch Q3 is connected to the switch Q2 via a resistor R13. The collector of the switch Q3 is connected to the second DC input terminal 9 of the controller CC via a resistor R14. And the emitter thereof is grounded. The collector of the switch Q3 is connected to the coupling node of the resistors R1 and R3 of the high frequency voltage detector HVD via the diode D4 so that the resistor R3 is shunt by the switch Q3.

Overcurrent Detector OCD

The overcurrent detector OCD is comprised of a current detecting element R15, resistors R16 and R17, and an impulse bypass capacitor C4. The current detecting element R15, which is comprised of a resistor with a low resistance, is connected in series between the source of the switching device Q1 of the high frequency generator HFG and the ground potential source. A series circuit of the resistors R16 and R17 is connected in parallel with the current detecting element R15 for dividing the voltage across the current detecting element R15. Thus a current detection signal is derived across the resistor R17. The impulse bypass capacitor C4 removes the impulse contained in the current detection signal voltage by bypassing therethrough, when the current detection signal voltage occurring across the resistor R17 contains such an impulse. Then, the impulse-free current detection signal is supplied to the overcurrent control input terminal 8 of the controller CC.

Operation

1. Normal Operation:

The high frequency generator HFG induces a high voltage of a high frequency across the secondary winding ws of the output transformer T, since the switching device Q1 and the output transformer T work together as a switching regulator. Then, the high frequency voltage output from the high frequency generator HFG is supplied to the discharge lamp DDL through the pair of outer electrodes 13, 13, so as to actuate lighting of the discharge lamp DDL. When the discharge lamp DDL is driven to light, an ultraviolet radiation is emitted by a dielectric barrier discharge of xenon in the discharge vessel 11, and it radiates the fluorescent substance layer 12. Therefore, the fluorescent substance is excited to generate the visible light.

According to the high frequency generating operation in the high frequency generator HFG, divided voltages corresponding to the high frequency voltage on the primary side appears across the resistor R3 of the voltage divider VD of the high frequency voltage detector section HVD in the high frequency operation detector HFD. The divided voltage is rectified in the diode D1, and then integrated by the resistor R2 and the capacitor C2. The integrated voltage is then supplied to the non-inverted input terminal 2 of the operational amplifier OP in the non-inverting amplifier NRA. At the operational amplifier OP, a difference of the integrated voltage and the reference voltage E is taken and then output through the output terminal 3 as the high frequency operation detection signal. The high frequency operation detection signal output from the output terminal 3 is supplied to the switching control input terminal 7 of the controller CC. The controller CC controls the on-duty of the switching device Q1 in the feedback control fashion so that the high frequency operation detection signal is kept in almost constant first level. So that, the high frequency is controlled to have a constant voltage.

By the way, in the no-load detector NLD, when the discharge lamp DDL is working normally by that the discharge lamp DDL is connected to the secondary winding ws of the output transformer T, a voltage drop occurs across the secondary winding's high frequency current detector R9. So that a base current flows through the base of the switch Q2 of the inverting switch circuit RSC. As a result, as the switch Q2 is turned ON, the collector voltage becomes approximately zero. Accordingly, the base potential of the switch Q3 goes to low and thus the switch Q3 is turned OFF. From this reason, the no-load detector NLD fails to output its detection output.

2. Abnormal Operation:

(1) No-load Condition:

Since the potential of the secondary winding's high frequency current detector R9 is zero in a no-load condition, the switch Q2 is in the OFF state. If the switch Q2 of the inverting switch circuit RSC is turned OFF, the base potential of the switch Q3 goes to high, and thus the switch Q3 is turned ON. As a result, the resistor R3 of the voltage divider VD in the high frequency operation detector HFD is shunt, and the voltage in the resistor R2 and the capacitor C2 are also decreased. So that, the potential of the non-inverted input terminal 2 in the operational amplifier OP drops to nearly zero, for instance about 0.5 V. Accordingly, the high frequency operation detection signal output from the output terminal 3 of the non-inverting amplifier NRA becomes zero, i.e., the second level. In response to the level change, the controller CC carries out a shutdown operation so as to suspend the high frequency generating action, i.e., the protection.

(2) Overcurrent State:

The voltage drop across the current detecting element R15 is increased at the overcurrent time. Accordingly, the voltage across the resistor R17 goes to high, and the voltage supplied to the overcurrent control input terminal 8 in the controller CC also goes to high. The controller CC carries out an overcurrent control so as to turn off the switching device Q1 in the high frequency generator HFG, when the voltage which is supplied to the overcurrent control input terminal 8 exceeds a predetermined value.

Even though a transient pulse of current, so called an impulse, occurs at an instant that the switching device Q1 has been turned ON, in such a case that the primary winding of the output transformer T has a large stray capacitance, the impulse bypass capacitor C4 suppresses the impulse. As a result, it prevents the malfunction of the overcurrent protection control due to the impulse.

Figure 5:
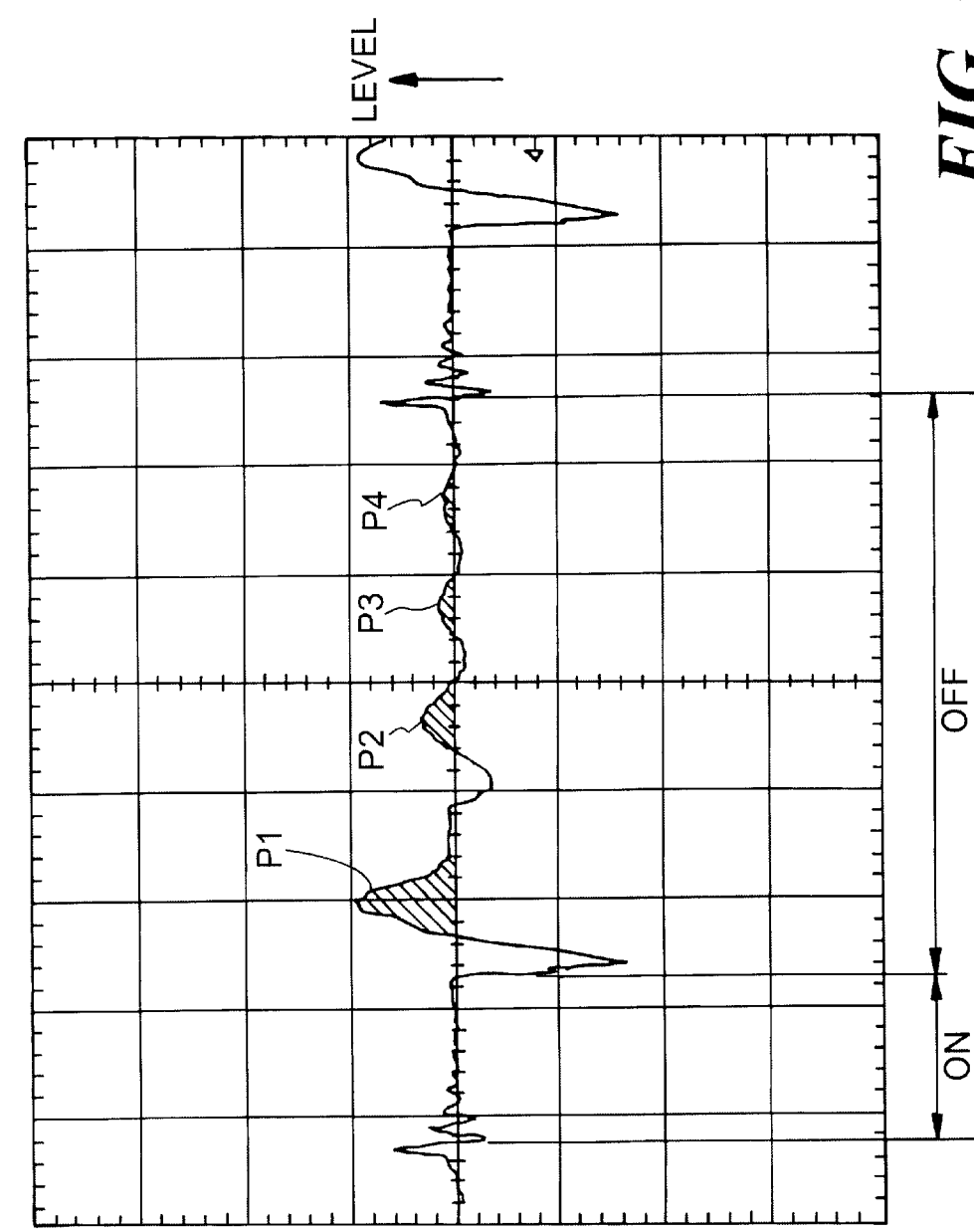
FIG. 5 is a waveform diagram showing a high frequency voltage during normal operation in the first embodiment of the discharge lamp light apparatus according to the present invention.

FIG. 5 is a waveform diagram showing a high frequency voltage during normal operation in the first embodiment of the discharge lamp lighting apparatus according to the present invention.

The high frequency voltage is a feedback voltage appearing across the resistor R3 of the high frequency operation detector HFD. In FIG. 5, the section "ON" on the time axis represents the ON period of the switching device Q1, and the section "OFF" on the time axis represents the OFF period of the switching device Q1. Accordingly, the turned-ON and the turned-OFF periods make together a unit switching period. Further, during the unit switching period, the shaded portions, i.e., the positive voltage portions of the high frequency voltage waveform are derived through the diode D1, then integrated by the parallel circuit of the resistor R2 and the capacitor C2, and then supplied to the non-inverted input terminal 2 of the operational amplifier OP.

Furthermore, in FIG. 5, the period of the pulse voltage P1 is different from the periods of the other pulse voltages P2 through P4. The reason of the difference of the periods will be explained in reference to FIG. 6.

Figure 6:
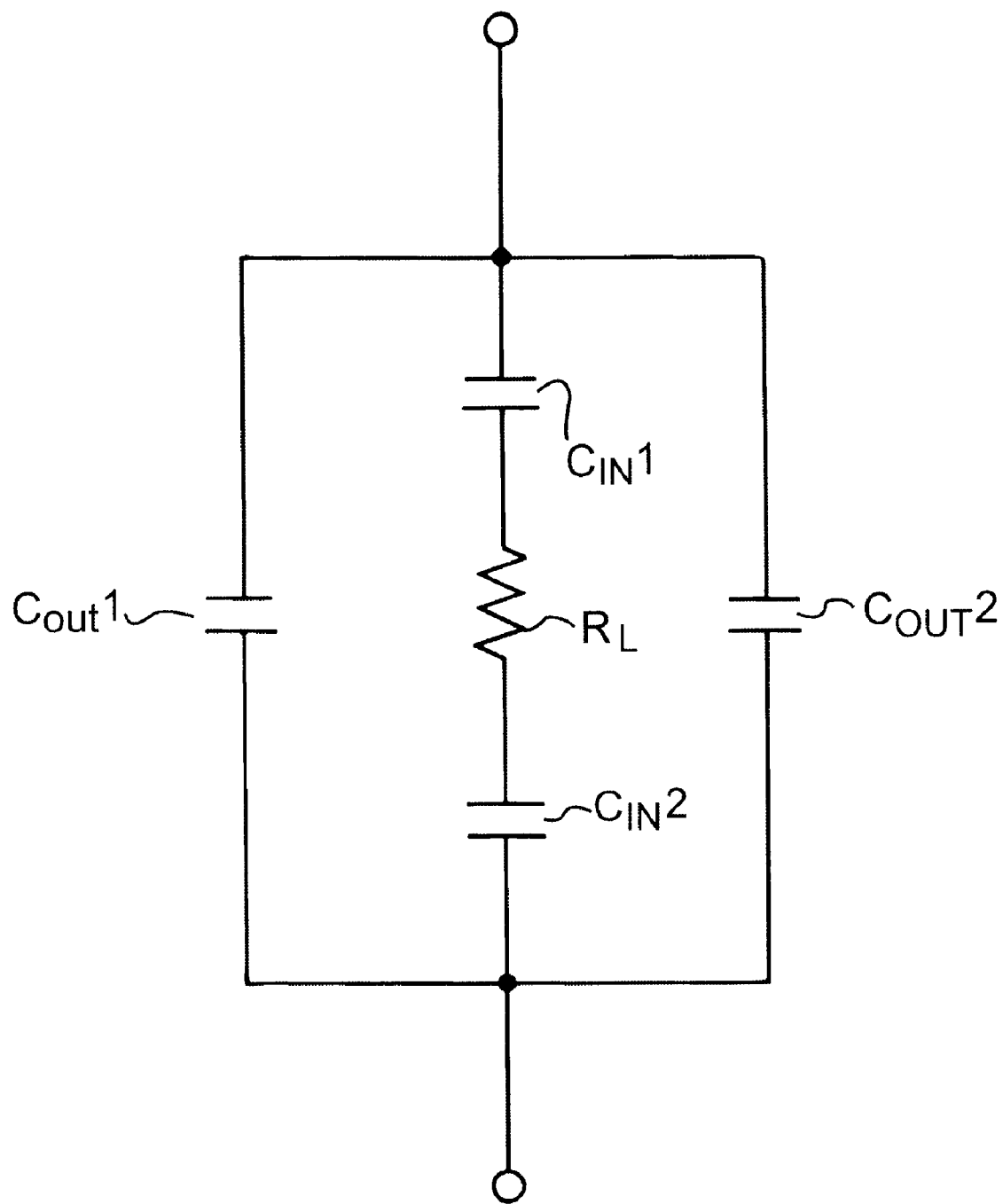
FIG. 6 is a diagram showing an equivalent circuit of the discharge lamp in the first embodiment of the discharge lamp lighting apparatus according to the present invention.

FIG. 6 is an equivalent circuit diagram of the discharge lamp in the first embodiment of the discharge lamp lighting apparatus according to the present invention.

The equivalent circuit of the discharge lamp is comprised of a capacitances $C_{IN}1$, $C_{IN}2$, $C_{OUT}1$, $C_{OUT}2$, and a load resistance $R_L$. In this equivalent circuit, the capacitances $C_{IN}1$, $C_{IN}2$ and the are connected in series. Then the series circuit and the capacitances $C_{OUT}1$, $C_{OUT}2$ are connected in parallel with each other. The capacitances $C_{IN}1$ and $C_{IN}2$ represent the electrostatic capacitances between the outer electrode 13 and the inner surface of the discharge vessel 11. Accordingly, the values of the capacitances $C_{IN}1$ and $C_{IN}2$ are defined by the area of the outer electrode 13, a relative dielectric constant and a thickness of the glass constituting the discharge vessel 11, and a relative dielectric constant and a thickness of the adhesive adhering the outer electrode 13 to the outer surface of the discharge vessel 11.

On the other hand, the capacitances $C_{OUT}1$ and $C_{OUT}2$ represent the electrostatic capacitances appearing principally around the outer surface of the discharge vessel 11 between the outer electrodes 13, 13. Accordingly, the values of the capacitances $C_{OUT}1$ and $C_{OUT}2$ are comparatively smaller than those of the capacitances $C_{IN}1$ and $C_{IN}2$.

Thus, a period of the pulse voltage P1 is determined by the resonance of the series circuit of the capacitances $C_{IN}1$ and $C_{IN}2$ and the load resistor $R_L$, and an inductance on the secondary winding of the output transformer T. On the contrary, the pulse voltages P2 through P4, which are generated by a ringing, have periods determined by the resonance of the capacitances $C_{OUT}1$ and $C_{OUT}2$ and an inductance on the secondary winding of the output transformer T.

As described above, the discharge lamp provided with an outer electrode for inducing a dielectric barrier discharge operates in a manner considerably different from other discharge lamps in which discharges are made between inner electrodes. Accordingly, the discharge lamp lighting apparatus associated with the present invention is required a different manner of control and a specific configuration.

Figure 7:
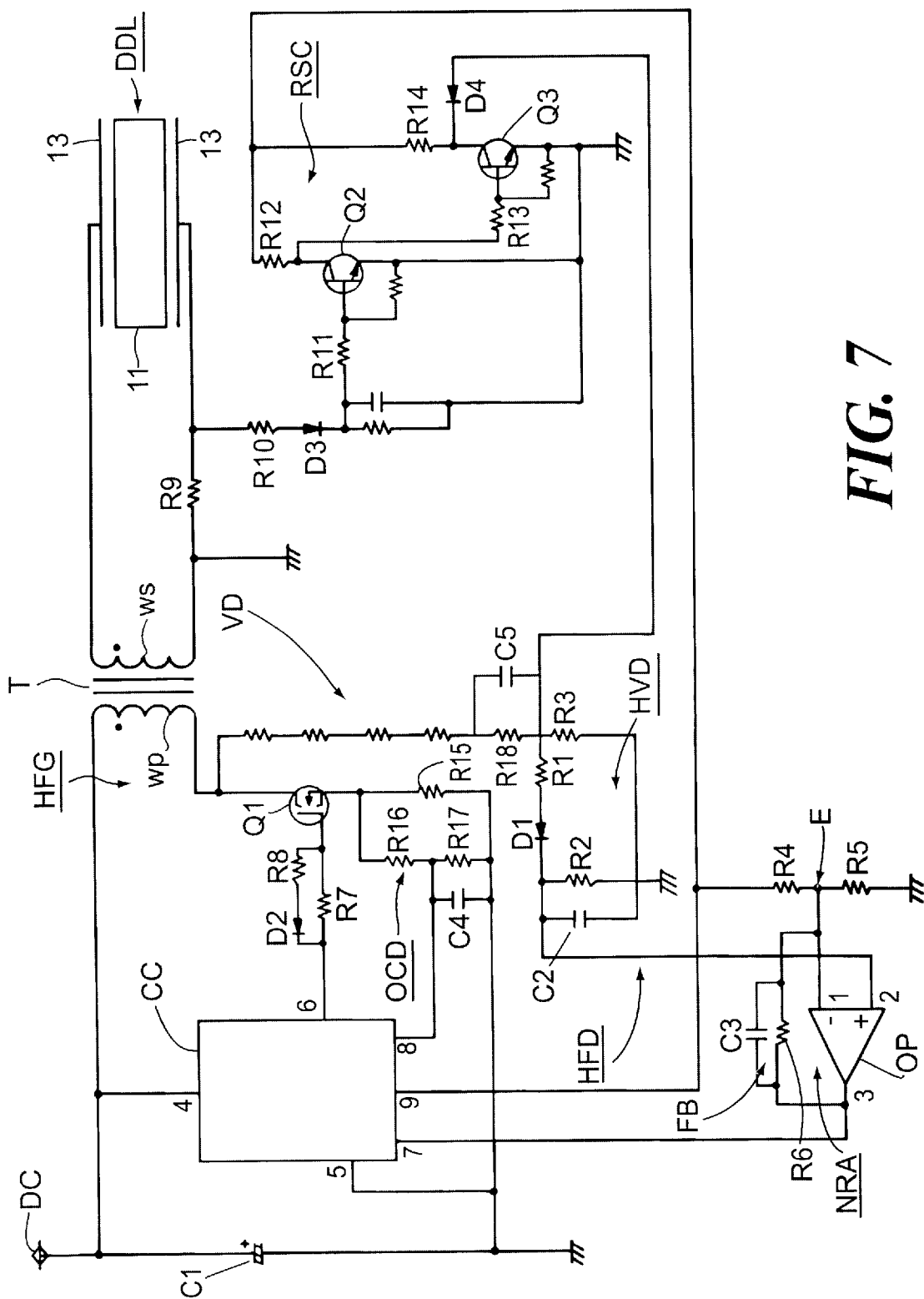
FIG. 7 is a schematic circuit diagram showing the second embodiment of the discharge lamp lighting apparatus according to the present invention.

FIG. 7 is a schematic circuit diagram showing a second embodiment of the discharge lamp lighting apparatus according to the present invention.

In FIG. 7, the same elements as those in FIG. 1 are assigned with the same marks, and are not discussed herein.

This embodiment is the same as the first embodiment, as shown in FIG. 1, in that a protecting operation is carried out for a no-load condition and an overcurrent state. However, this embodiment differs from the first embodiment by the configuration of the high frequency operation detector HFD. That is, a capacitor C5 in the high frequency operation detector HFD of this embodiment is connected in parallel with a resistor R18 of the voltage divider VD.

In this embodiment, higher harmonics in the high frequency voltage are bypassed the capacitor C5, so as to increase the voltage drop across the resistor R3 relatively. As a result, a voltage proportional to the high frequency power appears across the resistor R3. Since the high frequency operation detection signal is generated based on the voltage appearing across the resistor R3, then it is supplied to the switching control input terminal 7 in the controller CC, it is able to control the lighting of the discharge lamp DDL to be almost constant power.

Figure 8:
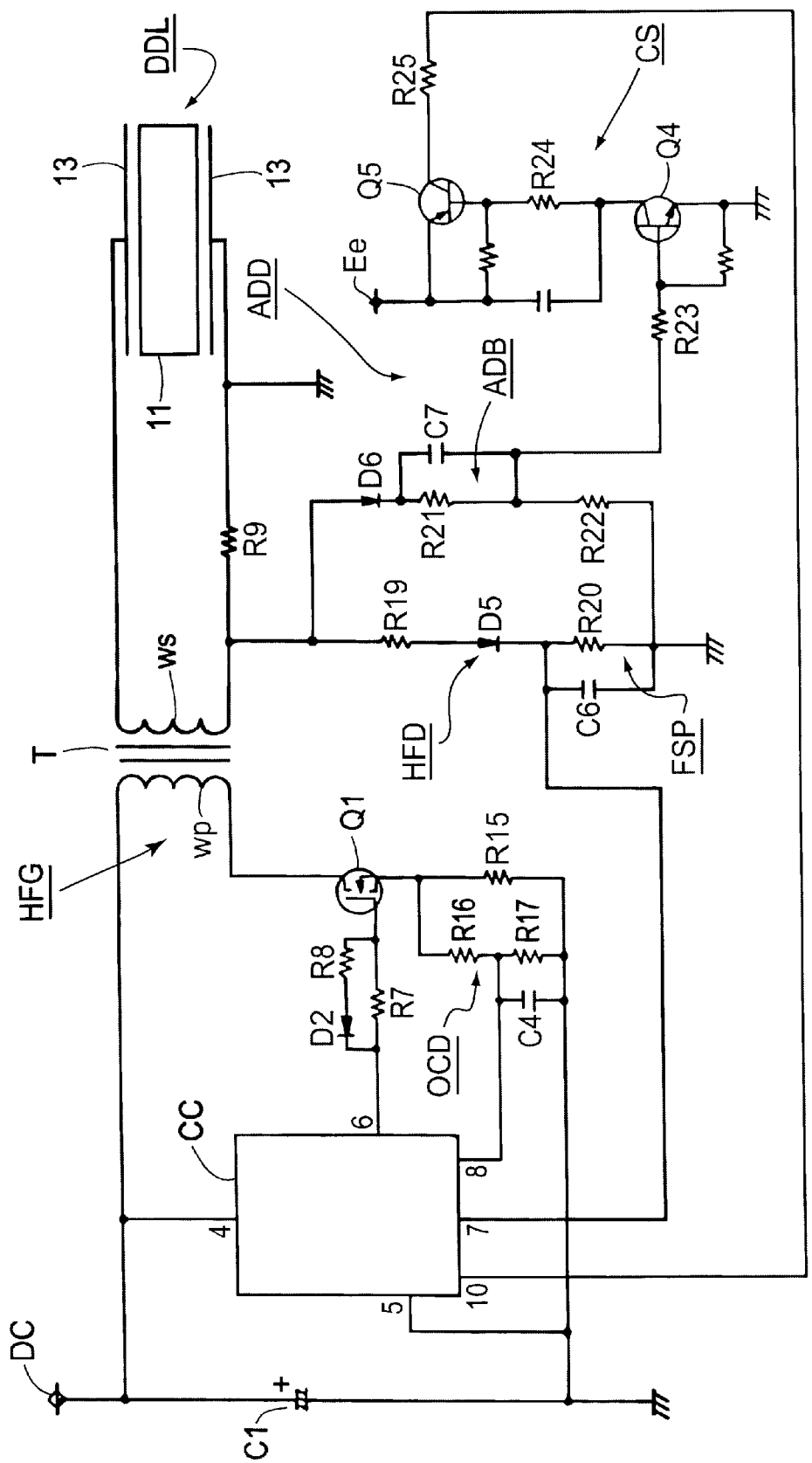
FIG. 8 is a schematic circuit diagram showing the third embodiment of the discharge lamp lighting apparatus according to the present invention.

Referring now to FIGS. 8 to 19, still other embodiments for carrying out protection for an abnormal discharge and an overcurrent state will be explained herein. Here, in these embodiments, as shown in FIGS. 8 and 19, the same components as those shown in FIG. 1 are assigned with same marks, and are not discussed herein.

FIG. 8 is a schematic circuit diagram showing a third embodiment of the discharge lamp lighting apparatus according to the present invention.

This embodiments differs from the first embodiment, as shown in FIG. 1, thereby the high frequency operation detector HFD detecting higher harmonics in the lamp current, and an abnormal discharge detector ADD is provided in place of the no-load detector NLD.

High Frequency Operation Detector HFD

The high frequency operation detector HFD is comprised of a secondary winding's high frequency current detector R9 and a feedback signal generator FSP. The secondary winding's high frequency current detector R9 is grounded by its one end connected to the discharge lamp DDL. The feedback signal generator FSP is comprised of a series circuit of a resistor R19, a diode D5 and a resistor R20, and a capacitor C6 connected in parallel with the resistor R20. One end of the series circuit of the resistors R19, R20 and a diode D5 is connected to the connecting node of the secondary winding's high frequency current detector R9 and a secondary winding ws of the output transformer T. While the other end of the series circuit is grounded. Then, a voltage across the resistor R20 or the capacitor C6 is supplied to the switching control input terminal 7 in the controller CC.

Abnormal Discharge Detector ADD

The abnormal discharge detector ADD is comprised of an abnormal discharge current bypass ADB and a control switch CS. The abnormal discharge current bypass ADB is a high-pass filter comprised of a series circuit of a diode D6 and resistors R21, R22, and a capacitor C7 connected in parallel with the resistor R21. The control switch CS is comprised of switches Q4 and Q5 which are typically bipolar transistors as its key components. The switch Q4 is controlled by the abnormal discharge current bypass ADB, while the switch Q5 is controlled in an amplifying manner by the switch Q4. That is, the base of the switch Q4 is connected to the connecting node of the diode D6 and the resistor R21 via a resistor R23 and the capacitor C7 of the abnormal discharge current bypass ADB. Further, the collector of the switch Q4 is connected to the base of the switch Q5 via a resistor R24, and the emitter of the switch Q4 is grounded. Furthermore, the emitter of the switch Q5 is connected to a DC power source Ee, and the collector of the switch Q5 is connected to an abnormal discharge control input terminal 10 in the controller via a resistor R25.

Operation

During normal operation, when the discharge lamp DDL is lighted and the lamp current flows, the voltage descends on the secondary winding's high frequency current detector R9 in the high frequency operation detector HFD, so that the potential differs from the ground potential. As a result, the integrated voltages appear across the resistor R20 and the capacitor C6. The integrated voltages are supplied to the switching control input terminal 10 in the controller CC as high frequency operation detection signals. Accordingly, the controller CC controls the phase of the gate driving signals supplied to the switching device Q1, so as to carry out the feedback control for the high frequency operation detection signal to be the first level. Accordingly, the lighting of the discharge lamp is controlled to be lighted with a fixed current.

Next, when an abnormal discharge occurs, an abnormal discharge current flows through the secondary winding's high frequency current detector R9. The abnormal discharge current contains higher order harmonics of more than 50 MHz on its pulse falling edge (pulse rising edge) compared with the lamp current during normal operation, therefore, the abnormal discharge current is bypassed via the diode D6 and the capacitor C7 in the abnormal discharge current bypass ADB. As a result, since the base current flows toward the base of the switch Q4, the switch Q4 is turned ON. When the switch Q4 is turned ON, the base current flows also in the base of the switch Q5 so as to turn on the switch Q5, so that an abnormal discharge detection signal is supplied to the abnormal discharge control input terminal 10 in the controller CC. The controller CC suspend the supply of the gate driving signal to the switching device Q1 when the abnormal discharge detection signal is supplied to the abnormal discharge control input terminal 10 in the controller CC. Thus, the high frequency generator HFG suspends the generation of the high frequency so as to carry out the protection.

Figure 9:
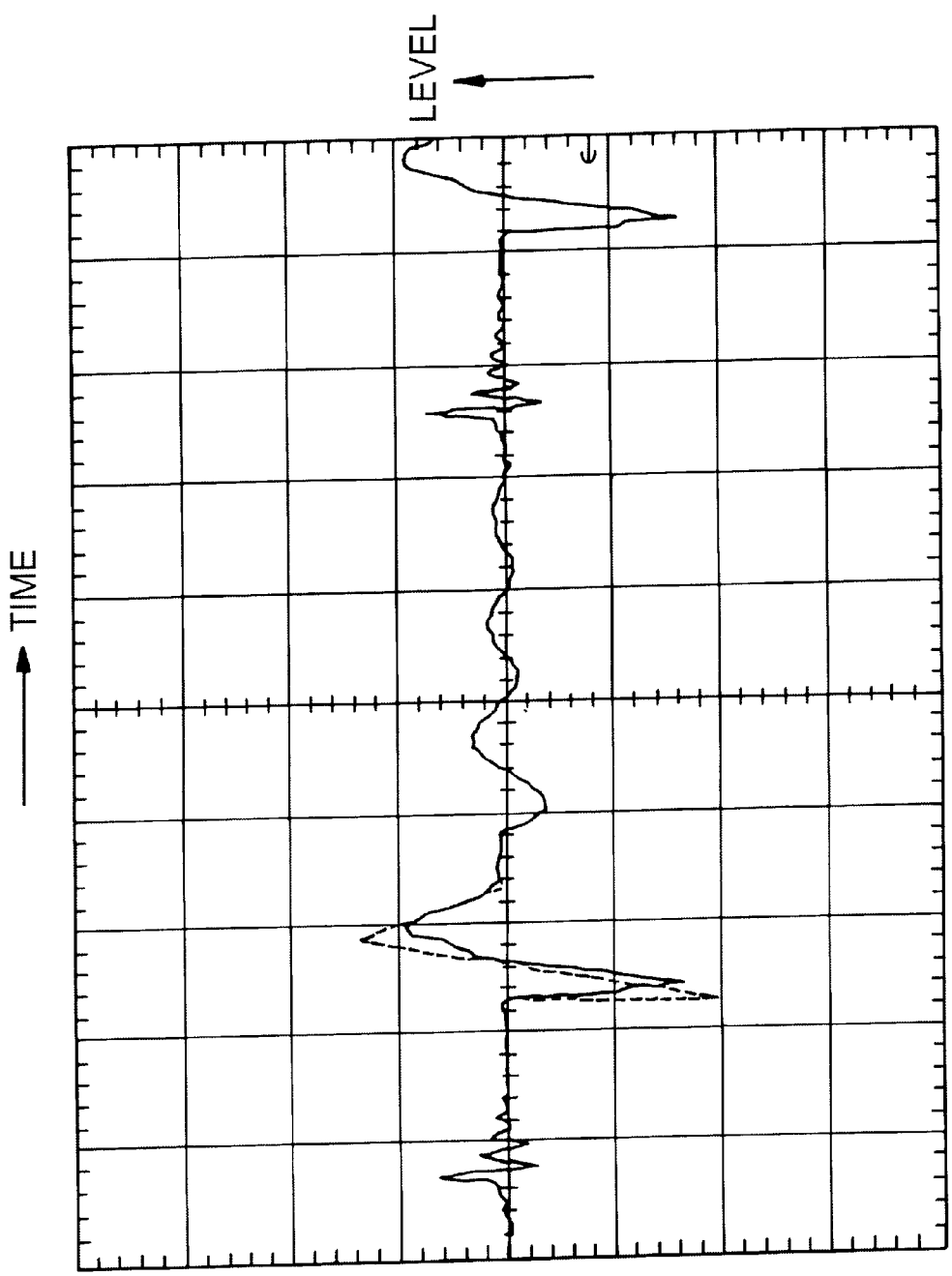
FIG. 9 is a schematic waveform diagram showing a lamp current and an abnormal discharge current in the third embodiment of the discharge lamp lighting apparatus according to the present invention.

FIG. 9 is a schematic waveform diagram showing a lamp current and an abnormal discharge current in the third embodiment of the discharge lamp lighting apparatus according to the present invention.

In FIG. 9, the solid line graph shows a high frequency current of the lamp current during normal operation, and the dotted line graph shows a schematic waveform diagram of the abnormal discharge current. Both waveforms are able to be obtained as terminal voltages of the secondary winding's high frequency current detector R9. That is, the abnormal discharge current rises (falls) abruptly and has a very high peak value in comparison to those in the normal operation.

Figure 10:
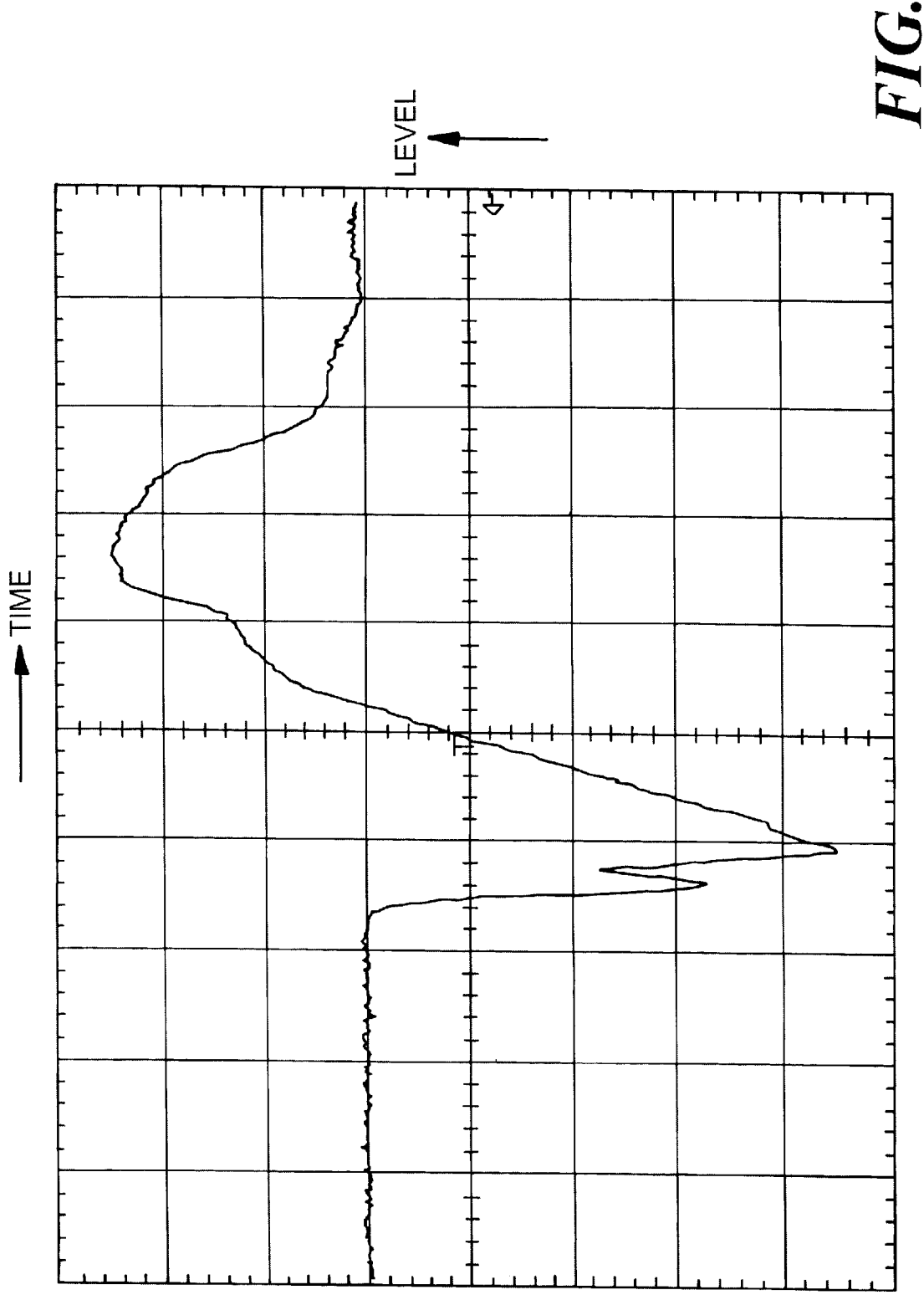
FIG. 10 is a partially enlarged waveform diagram of a high frequency current in a normal operation according to the third embodiment of the discharge lamp lighting apparatus.

FIG. 10 is a partially enlarged waveform diagram of a high frequency current in a normal operation according to the third embodiment of the discharge lamp lighting apparatus.

Figure 11:
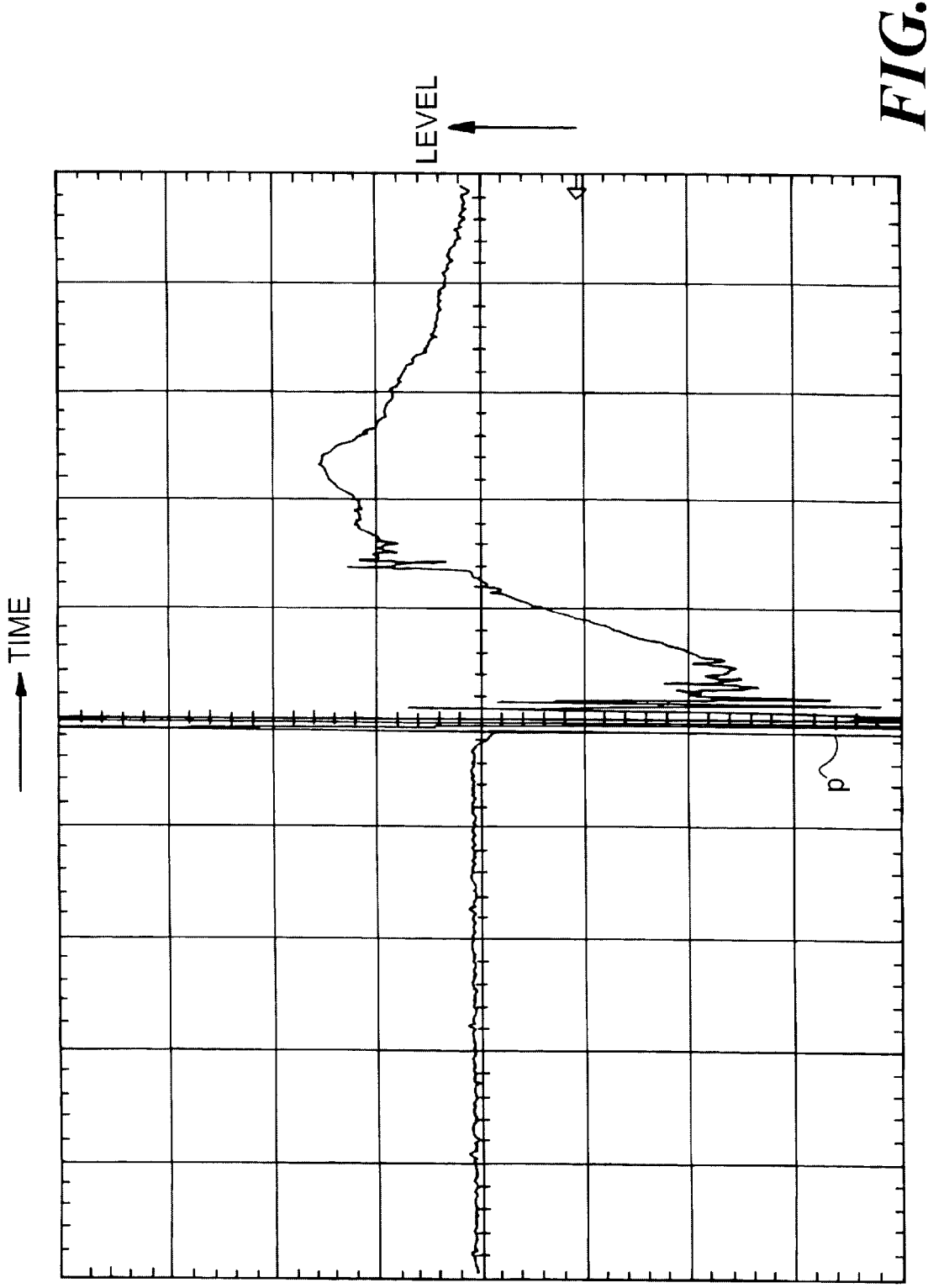
FIG. 11 is a partially enlarged waveform diagram of a high frequency current in an abnormal discharge operation according to the third embodiment of the discharge lamp lighting apparatus.

FIG. 11 is a partially enlarged waveform diagram of a high frequency current in an abnormal discharge operation according to the third embodiment of the discharge lamp lighting apparatus.

As can be clearly understood by comparing FIG. 10 and FIG. 11 with each other, in the abnormal discharge operation harmonics over 50 MHz are superimposed on the pulse falling edge (rising edge) of the lamp current, as designated by "p" in FIG. 11. From the reason, such a phenomenon as explained in reference to FIG. 9 arises.

Figure 12:
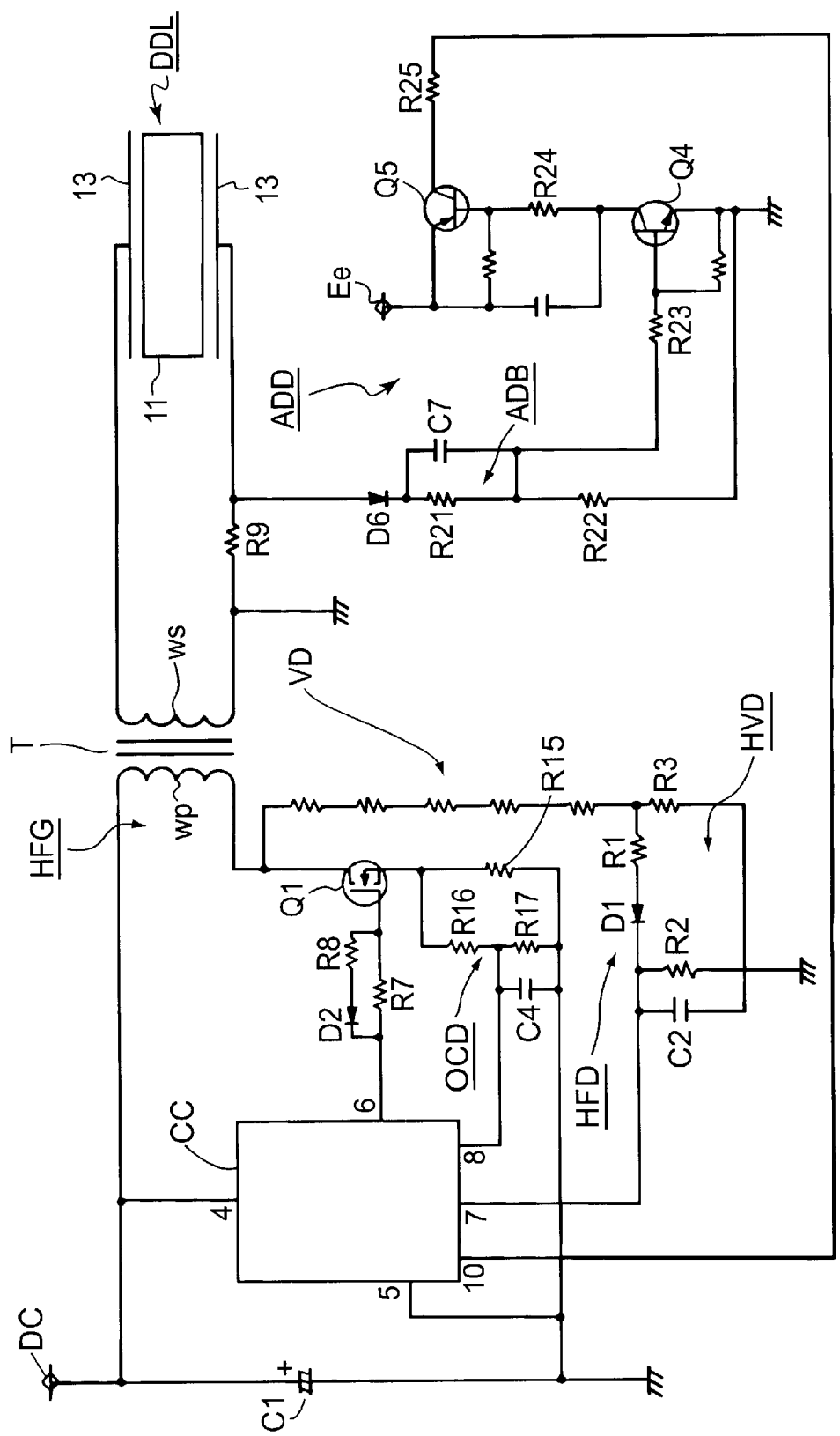
FIG. 12 is a schematic circuit diagram showing the fourth embodiment of the discharge lamp lighting apparatus according to the present invention.

FIG. 12 is a schematic circuit diagram showing a fourth embodiment of the discharge lamp lighting apparatus according to the present invention.

In this embodiment, the high frequency operation detector HFD detects the high frequency voltage. The high voltage detector section HVD is the same as that of the embodiment of FIG. 1. However, in the abnormal discharge detector ADD the secondary winding's high frequency current detector R9 has a configuration of ground connection different from that in the embodiment of FIG. 1.

High Frequency Operation Detector HFD

The high frequency operation detector HFD is comprised of only a high frequency detector section HVD. That is, the voltage across the resistor R2 or the capacitor C2 is supplied directly to the switching control input terminal 7 in the controller CC.

Abnormal Discharge Detector ADD

The secondary winding's high frequency current detector R9 in the abnormal discharge detector ADD is grounded its terminal connected to the secondary winding ws of the output transformer T. Further, the anode of the diode D6 in the series circuit of the abnormal discharge current bypass ADB is connected to the coupling node of the secondary winding's high frequency current detector R9 and the discharge lamp DDL.

Figure 13:
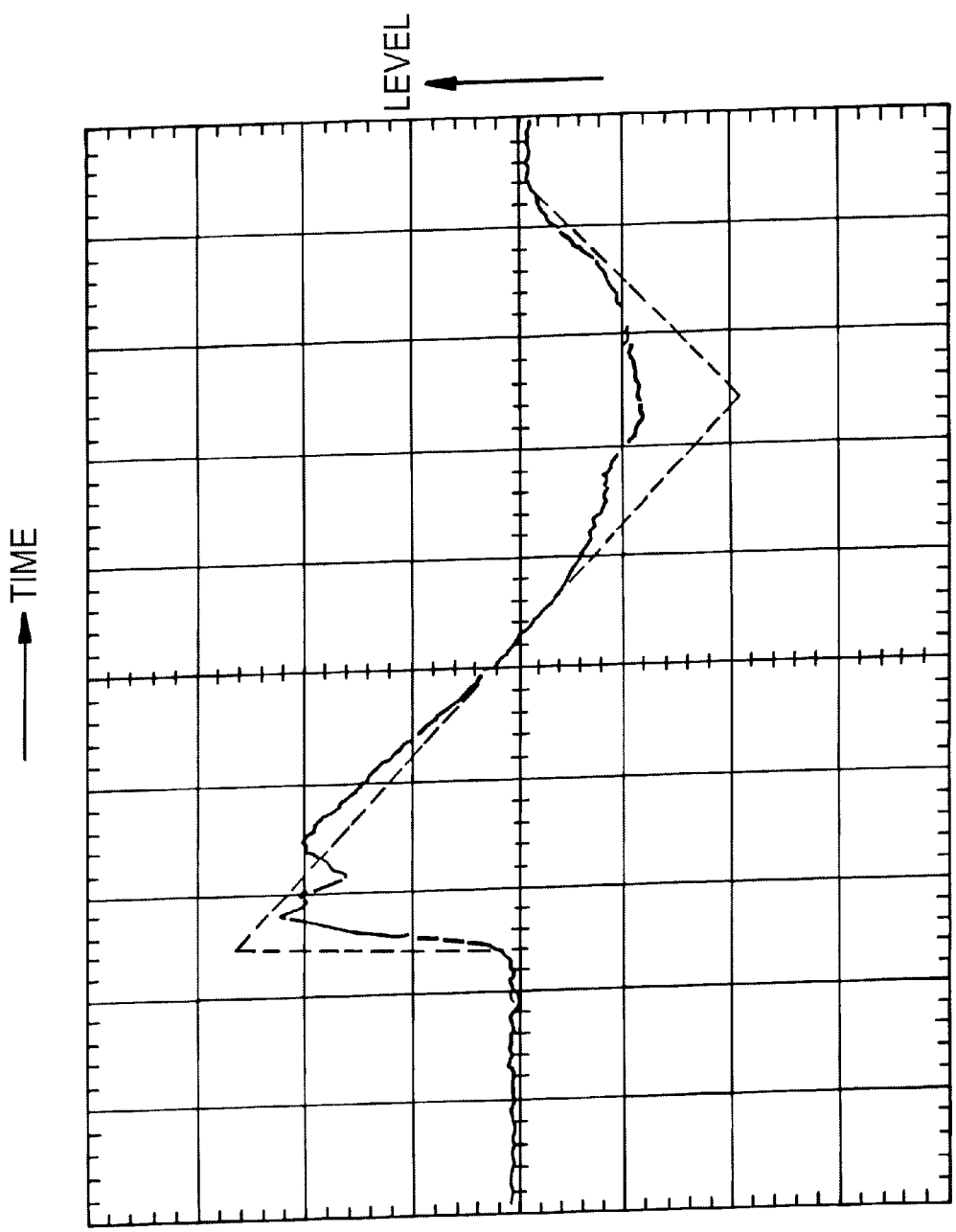
FIG. 13 is a waveform diagram showing the high frequency voltage during normal operation and the abnormal discharge operation in the fourth embodiment of the discharge lamp lighting apparatus according to the present invention.

FIG. 13 is a waveform diagram showing a high frequency voltage during normal operation in the fourth embodiment of the discharge lamp lighting apparatus according to the present invention.

In FIG. 13, the solid line shows a waveform diagram of the high frequency voltage during normal operation, and the dotted line shows a schematic voltage waveform diagram at the abnormal discharge operation. Both waveforms are voltages appearing across the resistor R3 of the overcurrent detector OCD.

Figure 14:
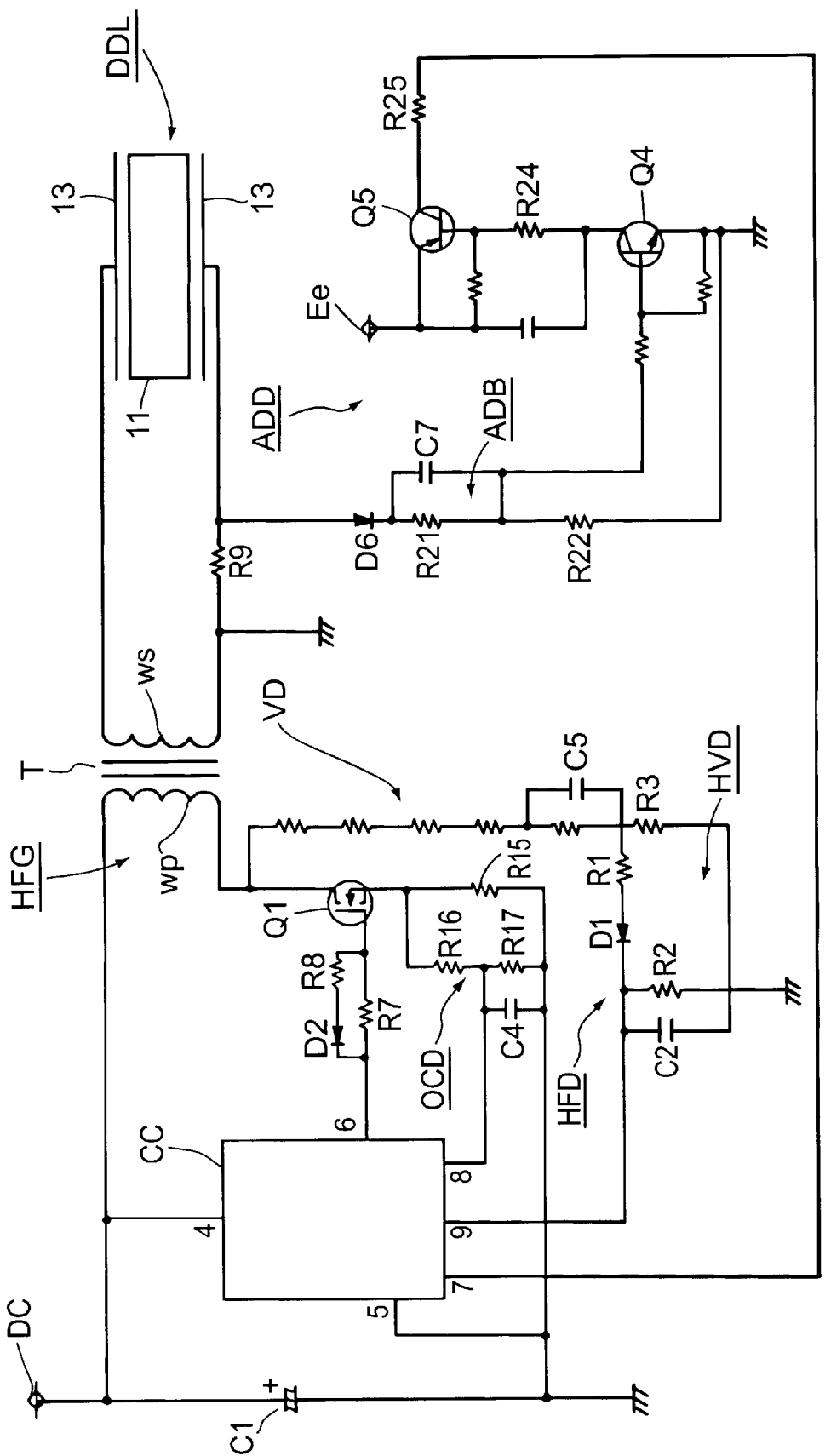
FIG. 14 is a schematic circuit diagram showing the fifth embodiment of the discharge lamp lighting apparatus according to the present invention.

FIG. 14 is a schematic circuit diagram showing the fifth embodiment of the discharge lamp lighting apparatus according to the present invention.

In this embodiment, the high frequency operation detector HFD is constructed to make a constant power control in similar to that of the second embodiment, as shown in FIG. 7. On the other hand, the high frequency operation detector HFD is comprised of the high frequency voltage detector section HVD only and the configuration of the abnormal discharge detector are the same as those of the fourth embodiment, as shown in FIG. 12. Accordingly, the explanations of them will be omitted herein.

Figure 15:
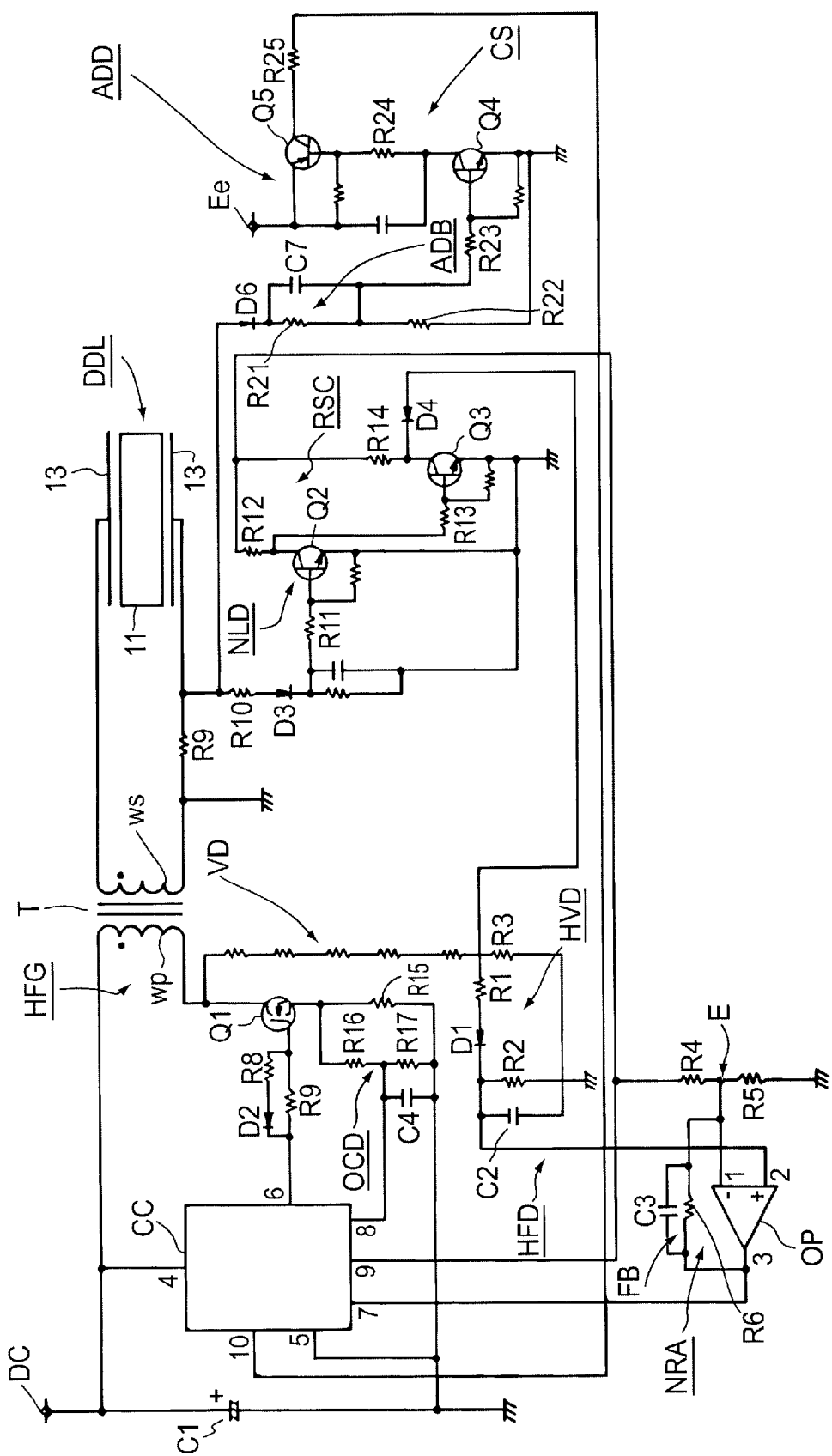
FIG. 15 is a schematic circuit diagram showing the sixth embodiment of the discharge lamp lighting apparatus according to the present invention.

FIG. 15 is a schematic circuit diagram showing a sixth embodiment of the discharge lamp lighting apparatus according to the present invention.

The present embodiment provides a more practical discharge lamp lighting apparatus by adding the abnormal discharge detector ADD and its associated controller CC to the embodiment as shown in FIG. 1. Thus, like reference numerals are assigned to the same portions as those in the embodiments as shown in FIGS. 1 and 8, and their descriptions will be omitted.

Figure 16:
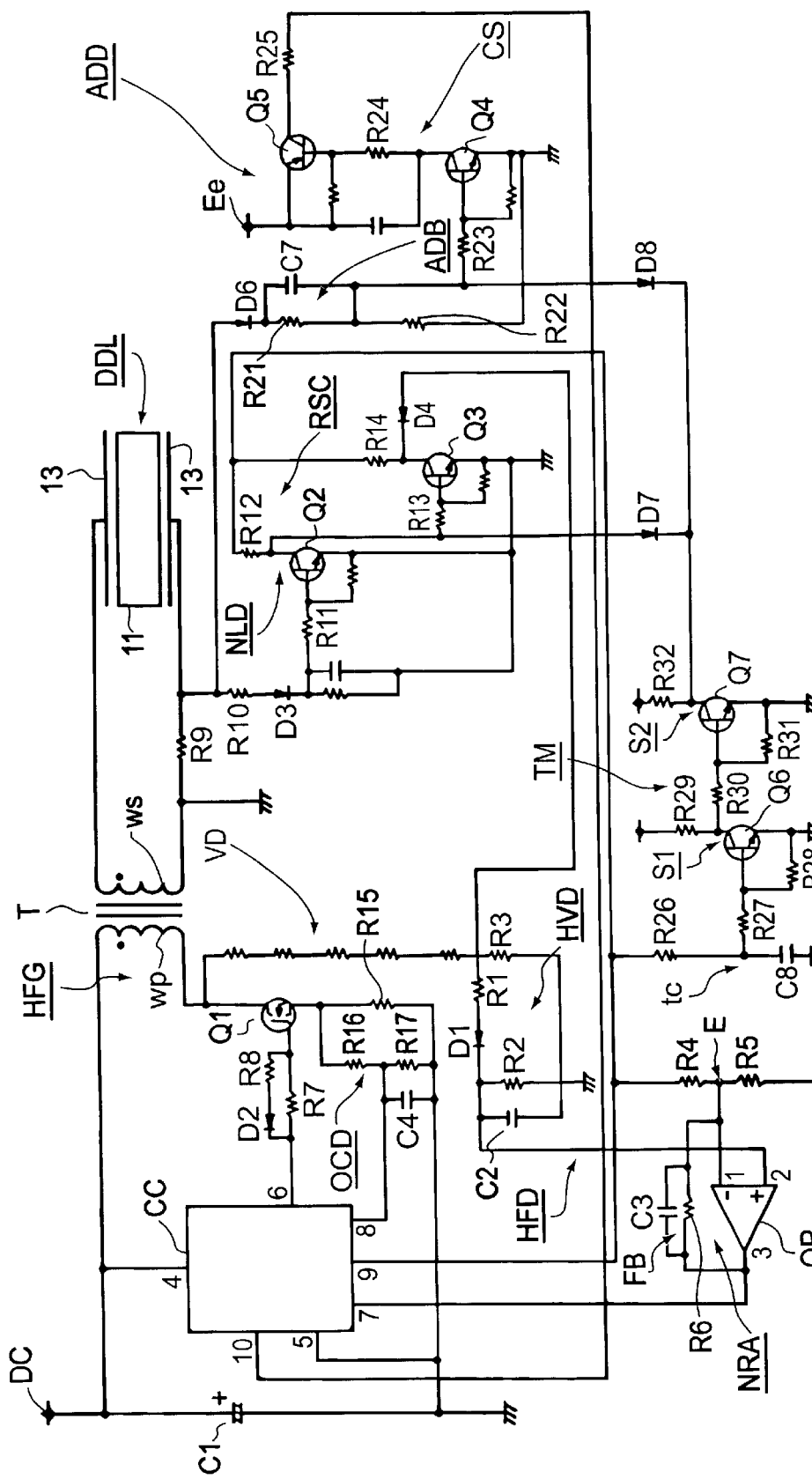
FIG. 16 is a schematic circuit diagram showing a seventh embodiment of the discharge lamp lighting apparatus according to the present invention.

FIG. 16 is a schematic circuit diagram showing a seventh embodiment of the discharge lamp lighting apparatus according to the present invention.

Further to the embodiment as shown in FIG. 15, the present embodiment is provided with a timer TM for suspending the protection operation of the controller for a predetermined period at the starting of the discharge lamp DDL.

The timer TM is comprised of a time constant circuit tc, a first switching circuit S1 and a second switching circuit S2

The time constant circuit tc is comprised of a series circuit of a resistor R26 and a capacitor C8, and connected between the DC input terminal 9 of the controller CC and the ground terminal. The time constant of the time constant circuit tc is set somewhat longer than the starting period of the discharge lamp DDL.

The first switching circuit S1 is comprised of a switching device Q6 which is a bipolar transistor and three resistors R27, R28, and R29. The base of the switching device Q6 is connected to the output terminal of the time constant circuit tc via the resistor R27.

The second switching circuit S2 is comprised of a switching device Q7 which is a bipolar transistor and three resistors R30, R31 and R32. The second switching circuit S2 is connected to the first switching circuit S1 so that its operation follows the first switching circuit S1. The output terminal of the second switching circuit S2 is connected to the no-load detector NLD and the abnormal discharge detector ADD through diodes D7 and D8. That is, the cathode of the diodes D7 and D8 are connected to the collector of the bipolar transistor of the second switching circuit S2. The anode of the diode D7 is connected to the collector of the switching device Q2 of the no-load detector NLD. The anode of the diode D8 is connected to the output terminal of the abnormal discharge bypass circuit ADB of the abnormal discharge detector ADD.

When the DC power source DC is turned on, the high frequency generator HFG generates a high frequency. The high frequency is then applied to the discharge lamp DDL. Thus the discharge lamp DDL starts its operation. In conjunction with the above operation, a low DC voltage is supplied to the second DC input terminal 9 of the controller CC and the time constant circuit tc of the timer TM. Thereby, the time constant circuit tc starts its operation. At this time, the switching device Q6 is in the OFF state and the switching device Q7 is in the ON state. When the switching device Q7 is in the ON state, the collector potential of the switching device Q2 is grounded through the diode D7 and the switching device Q7. Thus, the no-load detector NLD fails to detect the no-load state. On the other hand, since the output terminal of the abnormal discharge bypass circuit ADB of the abnormal discharge detector ADD is grounded through the diode D8 and the switching device Q7, the abnormal discharge detector ADD fails to detect the abnormal discharge of the discharge lamp DDL.

When a predetermined time has elapsed from the turn-ON of the DC power source DC, i.e., the time preset to the timer has expired, the potential of capacitor C8 of the time constant circuit tc rises, so that the switching device Q6 of the first switching circuit S1 is turned ON. At the instant that the switching device Q6 has been turned ON, the base potential of the switching device Q7 of the second switching circuit S2 goes to the ground potential. Thus the switching device Q7 of the second switching circuit S2 is turned OFF. As a result, the no-load detector NLD and the abnormal discharge detector ADD are released from the suspended states by the timer TM. Thus they are allowed to carry out their detection operations, respectively.

Figure 17:
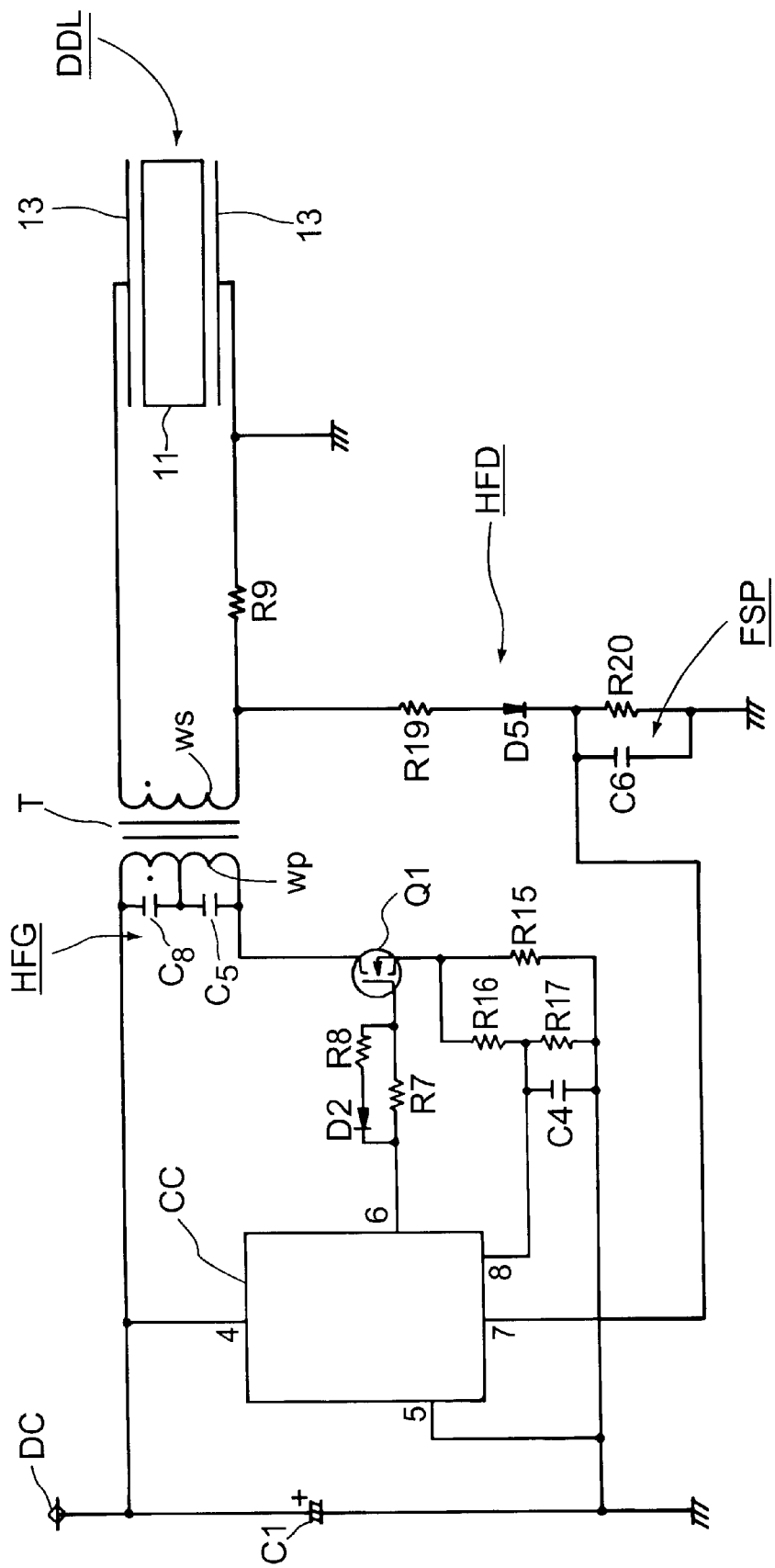
FIG. 17 is a schematic circuit diagram showing an eighth embodiment of the discharge lamp lighting apparatus according to the present invention.
Figure 18:
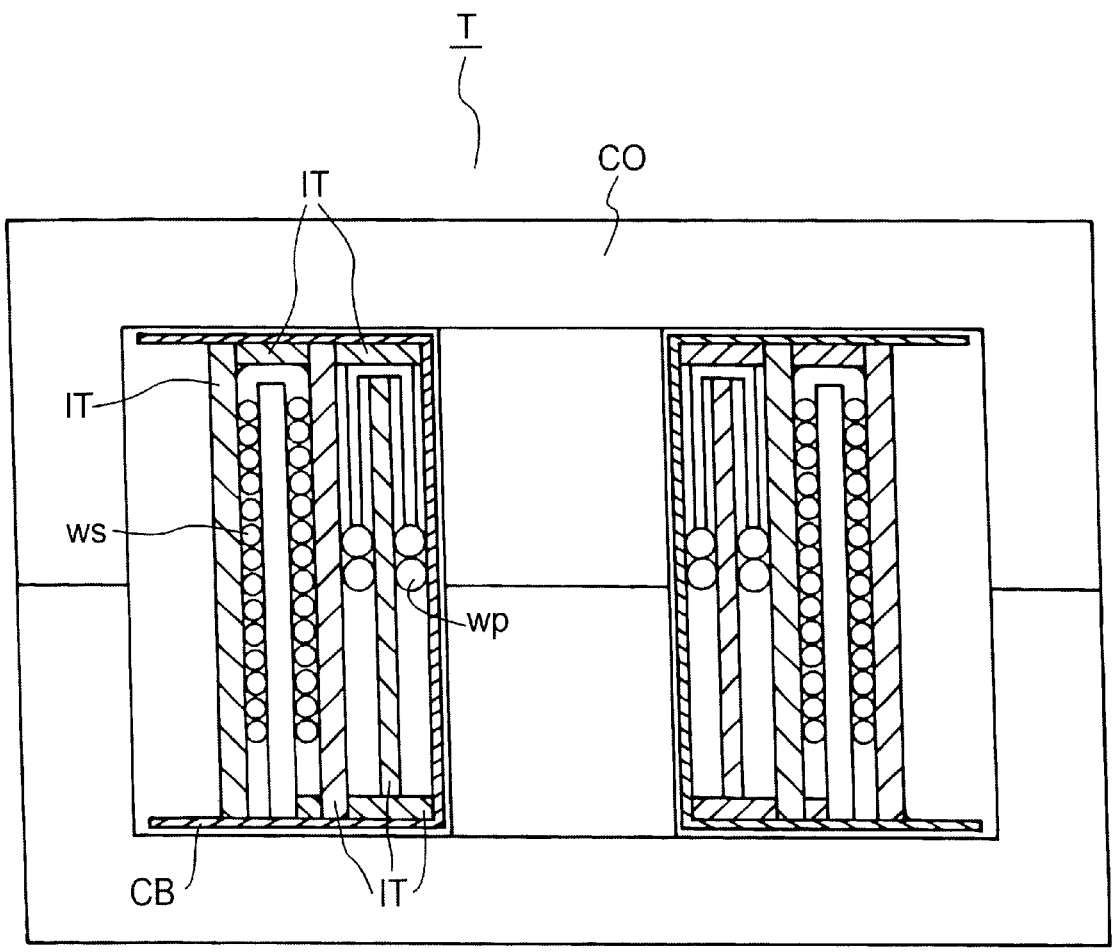
FIG. 18 is a front view of the magnetic structure of the output transformer of the sixth embodiment.

FIG. 17 is a schematic circuit diagram showing an eighth embodiment of the discharge lamp lighting apparatus according to the present invention;

FIG. 18 is a front view of a magnetic structure of the output transformer of the sixth embodiment.

Figure 19A:
FIGS. 19a and 19b are waveform diagrams of the voltage and the current of the sixth embodiment.
Figure 19B:

FIGS. 19a and 19b are diagrams showing a voltage waveform and a current waveform in the sixth embodiment.

In FIGS. 19a and 19b, the same elements as those in FIGS. 1 and 8 are assigned with same marks, and are not discussed herein. In this embodiment the structure of the output transformer differs from those of the prior embodiments.

That is, in FIG. 17, if the stray capacitance Cs appearing around the winding turns of the primary winding wp of the output transformer has a large figure, an impulse arises at the rising portion of the current that flows at an instant that the switching device Q1 has been turned ON. As a result, the controller CC fails to operate properly, and thus an unintended overcurrent protection is apt to be carried out. Accordingly, in this embodiment, the primary winding of the output transformer T is constructed in a multiplayer structure for reducing the stray capacitance Cs.

As shown in FIG. 18, the output transformer T is comprised of a core CO, a coil bobbin CB, a primary winding wp, a secondary winding ws and an insulation tape IP as its key components. The core CO is of an EER type ferrite. The primary winding wp is constituted in a structure of two-layers and four-turns by using a Litz wire, while the layers are insulated by an insulation sheet IT. The secondary winding ws is also constituted in a structure of two-layers and 52 turns, not but four turns.

In this embodiment, since the impulse fails to occur at an instant that the switching device Q1 has been turned ON, the high frequency generator HFG can operate normally, as shown in FIGS. 19a and 19b. Here, FIG. 19a shows the graph of the gate-source voltage of the switching device Q1, while FIG. 19b shows the graph of the voltage of the terminal of the resistor R15.

When impulses B occurs, as shown by the dotted lines in FIG. 19b, the controller CC carries out an unintended protecting operation by malfunction. At that time the gate drive signal ceases and thus the gate-source voltage also changes, as shown by the dotted lines in FIG. 19a.

Figure 20:
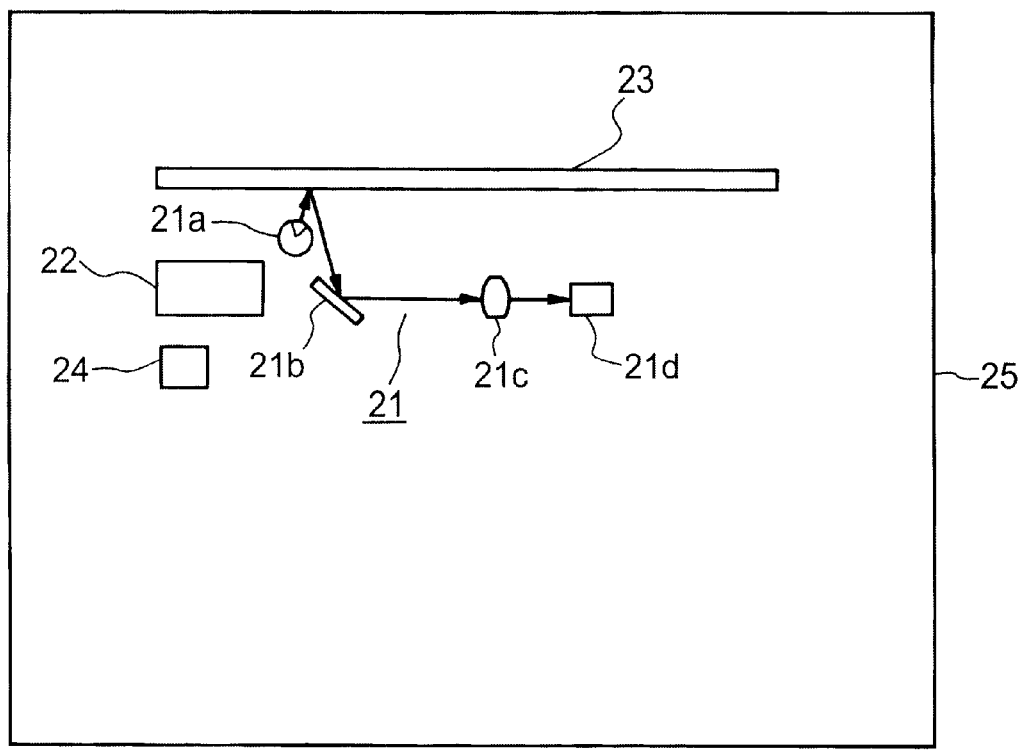
FIG. 20 is a schematic section showing an image scanning apparatus which is one application of the lighting device according to the present invention.

FIG. 20 is a schematic section showing an image scanning apparatus which is one application of the lighting device according to the present invention.

In FIG. 20, 21 denotes an image scanning optical system, 22 denotes a signal processor, 23 denotes a document glass, 24 denotes a lighting circuit, and 25 denotes a housing.

The image scanning optical system 21 is comprised of a fluorescent lamp 21a, a mirror 21b, a condenser lens 21c and a charge coupled device 21d as its key components in this embodiment. Alternatively, the image scanning optical system 21 may be comprised of a fluorescent lamp, a Selfoc lens and a charge coupled device (not shown) as its key components. The fluorescent lamp 21a has the construction, as shown in FIGS. 2 to 4. Then, the light emitted through the aperture is radiated to a document (not shown) cited on the document glass 23. A reflected light from the document is directed to a predetermined direction by a mirror 21b, then condensed by the condenser lens 21c, and then applied to a charge coupled device (CCD) 21d.

The signal processor 22 generates an image signal by processing the output signal from the light receiving means 21b.

The lighting circuit 24 drives lighting of the fluorescent lamp 21a at a high frequency.

The housing 25 accommodates therein the above-described components.

In the housing 25, the image scanning optical system 21 carries out a scanning operation by a relative movement between the image scanning optical system 21 and the document glass 23. That is, one or both of the image scanning optical system 21 and the document glass 23 is/are driven by a suitable driving mechanism (not shown) so as to make the relative movement. During the relative movement, the CCD 21d receives the light reflected from the document on the document glass 23. The CCD 21d then sequentially reads the reflected light from the document in the direction orthogonal to the direction of the relative movement. Here, the image scanning device according to the present embodiment is applied to an office automation device such as a copier, an image scanner, a fax machine etc.

The first and second aspects of the present invention can provide a discharge lamp lighting apparatus which execute a quick and appropriate protection by automatically detecting the no-load, by being comprised of, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting the high frequency voltage, for lighting the discharge lamp by supplying the high frequency voltage induced across a secondary winding of said output transformer to the discharge lamp through a pair of electrodes, a high frequency operation detector for detecting at least one of the high frequency voltage and the high frequency current and thus producing a high frequency operation detection signal, a controller responsive to the high frequency operation detection signal for controlling said switching device of the high frequency generator, that is, it carries out a feedback control to the switching of the switching device so that the high frequency operation detection signal becomes nearly a predetermined level during normal operation, while it controls the switching device to carry out protection when an abnormal discharge control signal is supplied, and a no-load detector for detecting a no-load condition of the secondary winding of the output transformer and forcefully changing the high frequency operation detection signal supplied to the controller to the second level.

According to the second aspect of the invention, since it is further provided with a regulator IC with a shutdown function capable of suspending generation of the high frequency to carry out a protection operation, it is possible to provide a discharge lamp lighting apparatus which is free from a hunting associated with the control operation, exact in its control operation, quick in its response, simple in its circuit assembly, superior in its detection accuracy since it detects the no-load state based on a lamp current, and simple in its circuitry, further to the effect according to the first aspect of the invention.

According to the third aspect of the invention, it is possible to provide a discharge lamp lighting apparatus which is able to carry out a speedy and appropriate protection by automatically detecting an abnormal discharge, by being comprised of, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller comprised of a regulator IC with a shutdown function for controlling said switching device of the high frequency generator in a feedback manner for a normal operation state in response to the high frequency operation detection signal applied thereto so that the high frequency operation detection signal becomes approximately a first level, while controlling the switching device of the high frequency generator so as to carry out a protection operation by operating the shutdown function when the high frequency operation detection signal has changed to a second level, and an abnormal discharge detector provided with an abnormal discharge current bypass wherein an abnormal discharge current flowing through the secondary winding of the output transformer is bypassed and a control switch for controlling the switching device to carry out protection by an abnormal discharge control signal applied to the controller of the switching device when a prescribed abnormal discharge current flows through said abnormal discharge current bypass.

1: Even is the abnormal discharge current is minute, this aspect of the invention quickly detects such an abnormal discharge current and carries out an accurate protection.

2: This aspect of the invention can exclusively detect the abnormal discharge regardless of the lamp current. Thus, this aspect of the invention can detects abnormal discharges even in a case lighting a discharge lamp for dimming, or a case of lighting a discharge lamp at a high power, without malfunction. Therefore, this aspect of the invention can be adaptable for a various modes of lighting a discharge lamp.

3: Since this aspect of the invention carries out a protection operation according to the shutdown function of the regulator IC, it fails to cause hunting in connection with the control operation. Moreover, the control becomes exact and the response becomes faster. In addition, a circuit assembly becomes simplified.

4: According to the above effects, the discharge lamp lighting apparatus grows in its total safety.

According to the fourth aspect of the invention, it is possible to provide a discharge lamp lighting apparatus which is able to carry out a speedy and appropriate protection by automatically detecting an overcurrent, by being comprised of, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller for controlling said switching device of the high frequency generator in a feedback manner for a normal operation state in response to the high frequency operation detection signal applied thereto so that the high frequency operation detection signal becomes around a prescribed level, while controlling the switching device of the high frequency generator so as to carry out a first protection operation when the high frequency operation detection signal has changed to a second level or a second protection operation when an abnormal discharge control signal has been applied thereto, a no-load detector for detecting a no-load condition of the secondary winding of the output transformer and forcefully changing the high frequency operation detection signal supplied to the controller to the second level, and an abnormal discharge current detector provided with a current detecting element for detecting a current flowing through the primary side of the output transformer and an impulse bypass capacitor connected in parallel with said current detecting element, for supplying a current detection signal to the controller.

According to the fifth aspect of the invention, it is possible to provide a discharge lamp lighting apparatus which is able to automatically detect an overcurrent and then quickly carry out a protection operation, by being comprised of, a discharge lamp provided with a discharge vessel filled with an inert gas-dominated discharge agent and a pair of electrodes at least one of which is placed on the outer surface of said discharge vessel, a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer, a high frequency operation detector for detecting at least one of the high frequency voltage and the high frequency current and thus producing a high frequency operation detection signal, a controller for controlling said switching device of the high frequency generator in a feedback manner for a normal operation state in response to the high frequency operation detection signal applied thereto so that the high frequency operation detection signal becomes around a prescribed level, while controlling the switching device of the high frequency generator so as to carry out a protection operation when the high frequency operation detection signal has exceeded a prescribed level, and a current detector provided with a current detecting element for detecting a current flowing through the primary side of the output transformer and an impulse bypass capacitor connected in parallel with said current detecting element, for supplying a current detection signal to the controller.

According to the sixth aspect of the invention, it is possible to provide a discharge lamp lighting which is possible to prevent the impulse which has occurred at an instant that the switching device has been turned ON, as a result of lowering the stray capacitance of the primary winding of the output transformer, by its primary winding being a multi-layered winding, in addition to the effects according to the first to fourth aspects of the invention.

The seventh aspect of the invention is further provided with a timer for suspending the protection operation of the controller for a predetermined period at the starting of the discharge lamp. Accordingly, the seventh aspect of the invention can provide a discharge lamp apparatus which is able to prevent undesired protection operations due to an unstable phenomenon transitionally occurring for a predetermined period at the time of starting.

According to the eighth aspect of the invention, it is possible to provide a lighting device as defined in the first to fifth aspects of the invention, since it is provided with a lighting device main body and a discharge lamp lighting apparatus as defined in the first to fifth aspects of the invention, which is equipped in the lighting device main body.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A discharge lamp lighting apparatus, comprising:
   a discharge lamp provided with a discharge vessel filled with an inert gas-dominated discharge agent and a pair of electrodes at least one of which is placed on the outer surface of said discharge vessel;
   a high frequency generator provided with a switching device for generating a high frequency voltage with a high frequency switching operation and an output transformer for outputting the high frequency voltage, for lighting the discharge lamp by supplying to the discharge lamp through the pair of electrodes with the high frequency voltage induced across a secondary winding of said output transformer;
   a high frequency operation detector for detecting at least one of the high frequency voltage and the high frequency current and thus producing a high frequency operation detection signal;
   a controller responsive to the high frequency operation detection signal for controlling said switching device of the high frequency generator, that is, it carries out a feedback control to the switching of the switching device so that the high frequency operation detection signal becomes nearly a predetermined level during normal operation, while it controls the switching device to carry out protection when an abnormal discharge control signal is supplied; and
   a no-load detector for detecting a no-load condition of the secondary winding of the output transformer and forcefully changing the high frequency operation detection signal supplied to the controller to a second level.

2. A discharge lamp lighting apparatus comprising;
   a discharge lamp provided with a discharge vessel filled with an inert gas-dominated discharge agent and a pair of electrodes at least one of which is placed on the outer surface of said discharge vessel;
   a high frequency generator provided with a DC supply, an output transformer connected across the terminals of the DC supply and a switching device connected in series with the primary winding of the output transformer for constituting a primary side circuit;

a high frequency operation detector for generating a high frequency operation detection signal by detecting at least one of a high frequency voltage or a high frequency current on a primary winding of the output transformer;

a controller comprised of a regulator IC with a shutdown function for controlling said switching device of the high frequency generator in a feedback manner for a normal operation state in response to the high frequency operation detection signal applied thereto so that the high frequency operation detection signal becomes approximately a first level, while controlling the switching device of the high frequency generator so as to carry out a protection operation by operating the shutdown function when the high frequency operation detection signal has changed to a second level; and a no-load detector for detecting a lamp current flowing through the discharge lamp and also for changing the high frequency operation detection signal supplied to the controller to be the second level when the lamp current is not detected.

3. A discharge lamp lighting apparatus comprising;

a discharge lamp provided with a discharge vessel filled with an inert gas-dominated discharge agent and a pair of electrodes at least one of which is placed on the outer surface of said discharge vessel;

a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer;

a high frequency operation detector for detecting at least one of the high frequency voltage and the high frequency current and thus producing a high frequency operation detection signal;

a controller comprised of a regulator IC with a shutdown function for controlling said switching device of the high frequency generator in a feedback manner for a normal operation state in response to the high frequency operation detection signal applied thereto so that the high frequency operation detection signal becomes around a prescribed level, while controlling the switching device of the high frequency generator so as to carry out a protection operation by operating the shutdown function when an abnormal discharge control signal has been applied thereto; and an abnormal discharge detector provided with an abnormal discharge current bypass wherein an abnormal discharge current flowing through the secondary winding of the output transformer is bypassed and a control switch for controlling the switching device to carry out protection by an abnormal discharge control signal applied to the controller of the switching device when a prescribed abnormal discharge current flows through said abnormal discharge current bypass.

4. A discharge lamp lighting apparatus comprising;

a discharge lamp provided with a discharge vessel filled with an inert gas-dominated discharge agent and a pair of electrodes at least one of which is placed on the outer surface of said discharge vessel;

a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer;

a high frequency operation detector for detecting at least one of the high frequency voltage and the high frequency current and thus producing a high frequency operation detection signal;

a controller for controlling said switching device of the high frequency generator in a feedback manner for a normal operation state in response to the high frequency operation detection signal applied thereto so that the high frequency operation detection signal becomes around a prescribed level, while controlling the switching device of the high frequency generator so as to carry out a first protection operation when the high frequency operation detection signal has changed to a second level or a second protection operation when an abnormal discharge control signal has been applied thereto; and a no-load detector for detecting a no-load condition of the secondary winding of the output transformer and forcefully changing the high frequency operation detection signal supplied to the controller to the second level;

an abnormal discharge current detector provided with a current detecting element for detecting a current flowing through the primary side of the output transformer and an impulse bypass capacitor connected in parallel with said current detecting element, for supplying a current detection signal to the controller.

5. A discharge lamp lighting apparatus comprising;

a discharge lamp provided with a discharge vessel filled with an inert gas-dominated discharge agent and a pair of electrodes at least one of which is placed on the outer surface of said discharge vessel;

a high frequency generator provided with a switching device for generating a high frequency voltage with a high frequency switching operation and an output transformer for outputting a high frequency voltage, for lighting the discharge lamp by supplying to the discharge lamp through a pair of electrodes with the high frequency voltage induced across a secondary winding of said output transformer;

a high frequency operation detector for detecting at least one of the high frequency voltage and the high frequency current and thus producing a high frequency operation detection signal;

a controller for controlling said switching device of the high frequency generator in a feedback manner for a normal operation state in response to the high frequency operation detection signal applied thereto so that the high frequency operation detection signal becomes around the prescribed level, while controlling the switching device of the high frequency generator so as to carry out a protection operation when the high frequency operation detection signal has exceeded the prescribed level; and a current detector provided with a current detecting element for detecting a current flowing through the primary side of the output transformer and an impulse bypass capacitor connected in parallel with said current detecting element, for supplying a current detection signal to the controller.

6. A discharge lamp lighting apparatus as claimed in any one of claims 1 to 5, wherein the output transformer is characterized in that its primary winding is a multi-layered winding.

7. A discharge lamp lighting apparatus as claimed in any one of claims 1 to 5, further comprising a timer for suspending the protection operation of the controller for a predetermined period at the starting of the discharge lamp.

8. A discharge lamp lighting apparatus, comprising:

a lighting apparatus main body; and a discharge lamp lighting apparatus as claimed in any one of claims 1 to 5 which is provided with said lighting apparatus main body.

\* \* \* \* \*